(12) United States Patent
Uechi et al.

(10) Patent No.: US 11,519,426 B2
(45) Date of Patent: Dec. 6, 2022

(54) PRESSURIZING DEVICE, CARBON DIOXIDE CYCLE PLANT, AND COMBINED CYCLE PLANT

(71) Applicant: MITSUBISHI HEAVY INDUSTRIES, LTD., Tokyo (JP)

(72) Inventors: Hideyuki Uechi, Tokyo (JP); Tatsuo Ishiguro, Tokyo (JP); Norito Katsuki, Tokyo (JP); Takahiro Hidaka, Tokyo (JP); Teppei Hata, Tokyo (JP); Takahiro Yamana, Tokyo (JP); Shigeki Senoo, Tokyo (JP); Yuichiro Hirano, Tokyo (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 142 days.

(21) Appl. No.: 17/160,600

(22) Filed: Jan. 28, 2021

(65) Prior Publication Data
US 2021/0254633 A1    Aug. 19, 2021

(30) Foreign Application Priority Data
Feb. 14, 2020   (JP) .............................. JP2020-023119

(51) Int. Cl.
*F04D 29/58*  (2006.01)
*F04D 29/44*  (2006.01)
*F04D 29/42*  (2006.01)

(52) U.S. Cl.
CPC ..... *F04D 29/5826* (2013.01); *F04D 29/4206* (2013.01); *F04D 29/444* (2013.01)

(58) Field of Classification Search
None
See application file for complete search history.

(56) References Cited

U.S. PATENT DOCUMENTS

| | | | | |
|---|---|---|---|---|
| 5,428,953 A | * | 7/1995 | Siga | ........................ C22C 38/46 60/39.182 |
| 5,906,096 A | * | 5/1999 | Siga | ........................ C22C 38/44 415/199.5 |
| 2014/0020359 A1 | * | 1/2014 | Mimura | .................. F01D 11/08 60/39.182 |
| 2019/0323519 A1 | * | 10/2019 | Aoyama | ............... F04D 29/545 |

FOREIGN PATENT DOCUMENTS

| | | |
|---|---|---|
| JP | 64-046498 | 3/1989 |
| JP | 09-303287 | 11/1997 |
| JP | 2010-265784 | 11/2010 |
| JP | 2015-135068 | 7/2015 |

* cited by examiner

*Primary Examiner* — Michael Lebentritt
(74) *Attorney, Agent, or Firm* — Wenderoth, Lind & Ponack, L.L.P.

(57) ABSTRACT

A non-positive displacement type pressurizing device for pressurizing a fluid includes a rotor including a rotary blade row including a plurality of rotary blades provided at intervals in a circumferential direction; a casing that accommodates the rotor; a stationary blade row supported by the casing and including a plurality of stationary blades provided at intervals in the circumferential direction; and a plurality of heat exchanging units for cooling the fluid, wherein the heat exchanging units are configured to divide a flow path formed between stationary blades, of the plurality of stationary blades, adjacent to one another in the circumferential direction in a height direction of the stationary blades.

20 Claims, 22 Drawing Sheets

PRESSURIZING DEVICE, CARBON DIOXIDE CYCLE PLANT, AND COMBINED CYCLE PLANT

CROSS-REFERENCE TO RELATED APPLICATIONS

This application claims the benefit of priority to Japanese Patent Application Number 2020-023119 filed on Feb. 14, 2020. The entire contents of the above-identified application are hereby incorporated by reference.

TECHNICAL FIELD

The disclosure relates to a pressurizing device, a carbon dioxide cycle plant, and a combined cycle plant.

RELATED ART

JP 64-46498 UM-A describes reducing the power consumption of a centrifugal compressor, which is a pressurizing device, by providing fins on a pressure surface and a suction surface of return vanes supported on a casing of the centrifugal compressor and describes cooling a fluid that flows through the return vanes via heat exchange between the fins and the fluid. According to this configuration, the efficiency of the centrifugal compressor can be increased by bringing the compression of the fluid in the compressor close to isothermal compression and by reducing the motive power required to pressurize the centrifugal compressor.

SUMMARY

The fins of the return vane described in JP 64-46498 UM-A can reduce the motive power required to pressurize the fluid in the pressurizing device, but the reduction effect is limited.

In light of the foregoing, an object of the disclosure is to provide: a pressurizing device requiring little motive power to pressurize a fluid; and a carbon dioxide cycle plant and a combined cycle plant provided with the same.

A pressurizing device according to the disclosure is a non-positive displacement type pressurizing device for pressurizing a fluid, comprising:

a rotor including a rotary blade row including a plurality of rotary blades provided at intervals in a circumferential direction;

a casing that accommodates the rotor;

a stationary blade row supported by the casing and including a plurality of stationary blades provided at intervals in the circumferential direction; and a plurality of heat exchanging units for cooling the fluid, wherein the heat exchanging units are configured to divide a flow path formed between stationary blades, of the plurality of stationary blades, adjacent to one another in a height direction of the stationary blades.

According to the disclosure, provided are a pressurizing device requiring little motive power to pressurize a fluid; and a carbon dioxide cycle plant and a combined cycle plant provided with the same.

BRIEF DESCRIPTION OF DRAWINGS

The disclosure will be described with reference to the accompanying drawings, wherein like numbers reference like elements.

DESCRIPTION OF EMBODIMENTS

An embodiment will be described hereinafter with reference to the appended drawings. It is intended, however, that unless particularly specified, dimensions, materials, shapes, relative positions and the like of components described in the embodiments shall be interpreted as illustrative only and not intended to limit the scope of the invention.

For instance, an expression of relative or absolute arrangement such as "in a direction", "along a direction", "parallel", "orthogonal", "centered", "concentric" and "coaxial" shall not be construed as indicating only the arrangement in a strict literal sense, but also includes a state where the arrangement is relatively displaced by a tolerance, or by an angle or a distance whereby it is possible to achieve the same function.

For instance, an expression of an equal state such as "same" "equal" and "uniform" shall not be construed as indicating only the state in which the feature is strictly equal, but also includes a state in which there is a tolerance or a difference that can still achieve the same function.

Further, for instance, an expression of a shape such as a rectangular shape or a cylindrical shape shall not be construed as only the geometrically strict shape, but also includes a shape with unevenness or chamfered corners within the range in which the same effect can be achieved.

On the other hand, an expression such as "comprise", "include", "have", "contain" and "constitute" are not intended to be exclusive of other components.

Figure 1:
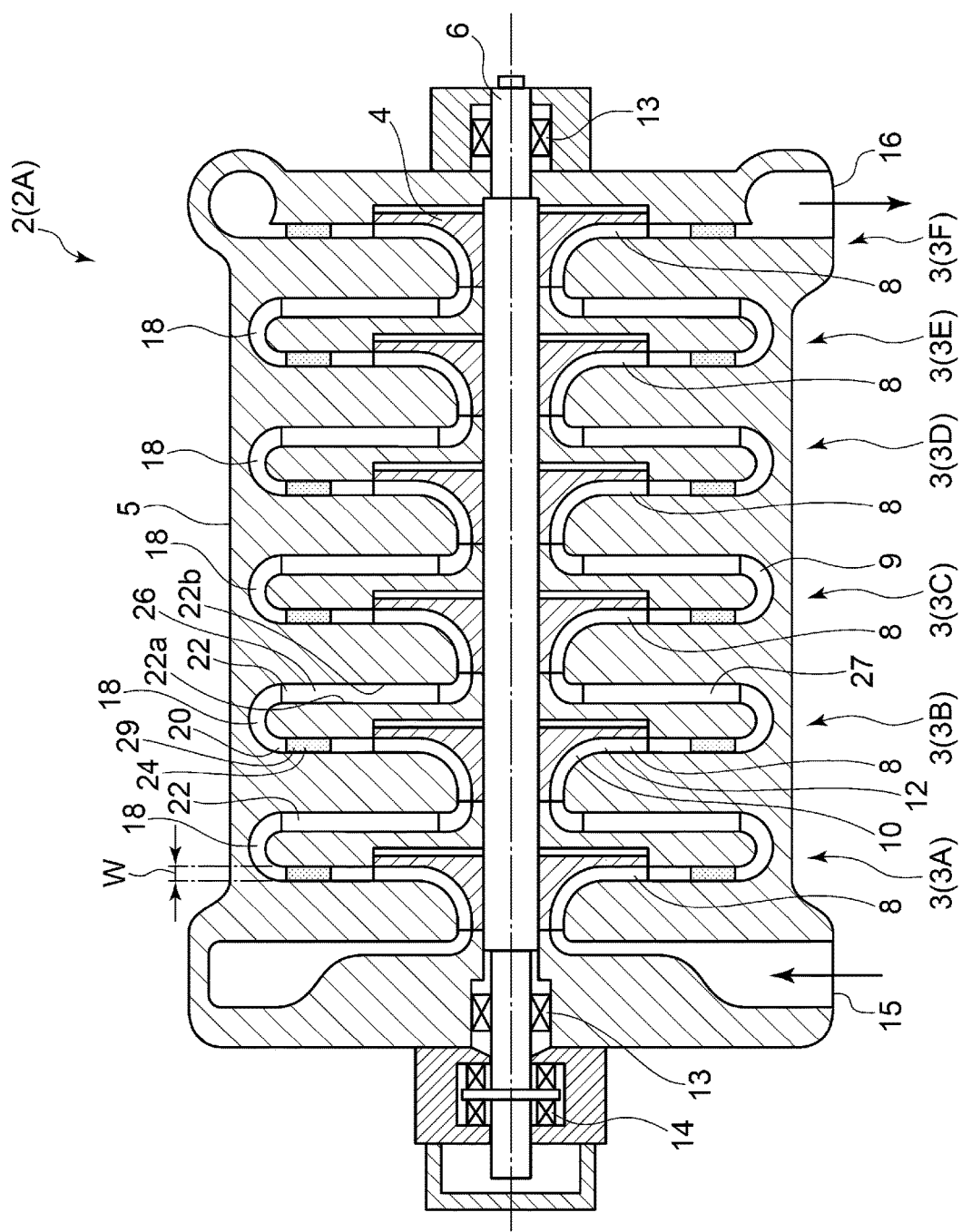
FIG. 1 is a cross-sectional view illustrating a schematic configuration of a pressurizing device 2(2A) according to an embodiment.

FIG. 1 is a cross-sectional view illustrating a schematic configuration of a pressurizing device 2(2A) according to an embodiment.

The exemplary pressurizing device 2(2A) illustrated in FIG. 1 is a centrifugal and a non-positive displacement type of pressurizing device and includes a plurality of stages 3 arranged in series in the flow direction of a fluid F to be pressurized. In the exemplary example illustrated, the pressurizing device 2(2A) includes six stages 3A to 3F arranged in series in the flow direction of the fluid F. The pressurizing device 2(2A) includes a rotor 4 for pressurizing the fluid F and a casing 5 that houses the rotor 4. The type of fluid F is not particularly limited, but may be supercritical fluid of $CO_2$, for example. Hereinafter, the axial direction of the rotor 4 is simply referred to as the "axial direction"; the radial direction of the rotor 4 is simply referred to as the "radial direction"; and the circumferential direction of the rotor 4 is simply referred to as the "circumferential direction".

The rotor 4 includes a shaft 6 and a plurality of impellers 8 attached to the shaft 6 side by side in the axial direction. In the exemplary example illustrated, six impellers 8 are provided in series on the shaft 6. The shaft 6 is rotatably supported in the casing 5 via a journal bearing 13 and a thrust bearing 14.

Each of the impellers 8 includes a rotary blade row 12 (impeller blade row) including a plurality of rotary blades 10 (impeller blades) provided at intervals in the circumferential direction.

The casing 5 is configured to surround the plurality of impellers 8. In the casing 5, an inlet 15 (suction port) in which the fluid F flows in from the outside of the casing 5 is formed on one side in the axial direction, and an outlet 16 (discharge port) in which the fluid F flows out of the casing 5 is formed on the other side in the axial direction. A flow path 9 is formed inside the casing 5 that guides the fluid F from the inlet 15 to the outlet 16.

The flow path 9 of the casing 5 includes a return flow path 18 that guides the fluid F that has flowed out to the outside in the radial direction from the impellers 8 to the impellers 8 of the next stage 3, the return flow path 18 being provided in each stage 3 except the final stage. Each of the return flow paths 18 includes: a diffuser flow path portion 20 that guides the fluid F that has flowed out from the upstream impeller 8 to the outside in the radial direction; and a return flow path portion 22 that guides the fluid F that has passed through the diffuser flow path portion 20 to the inside in the radial direction to supply the fluid F to the impeller 8 of the next stage. The diffuser flow path portion 20 is provided with a diffuser vane row 29 including a plurality of diffuser vanes 24 provided at intervals in the circumferential direction, and each of the diffuser vanes 24 is supported by the casing 5.

Figure 2:
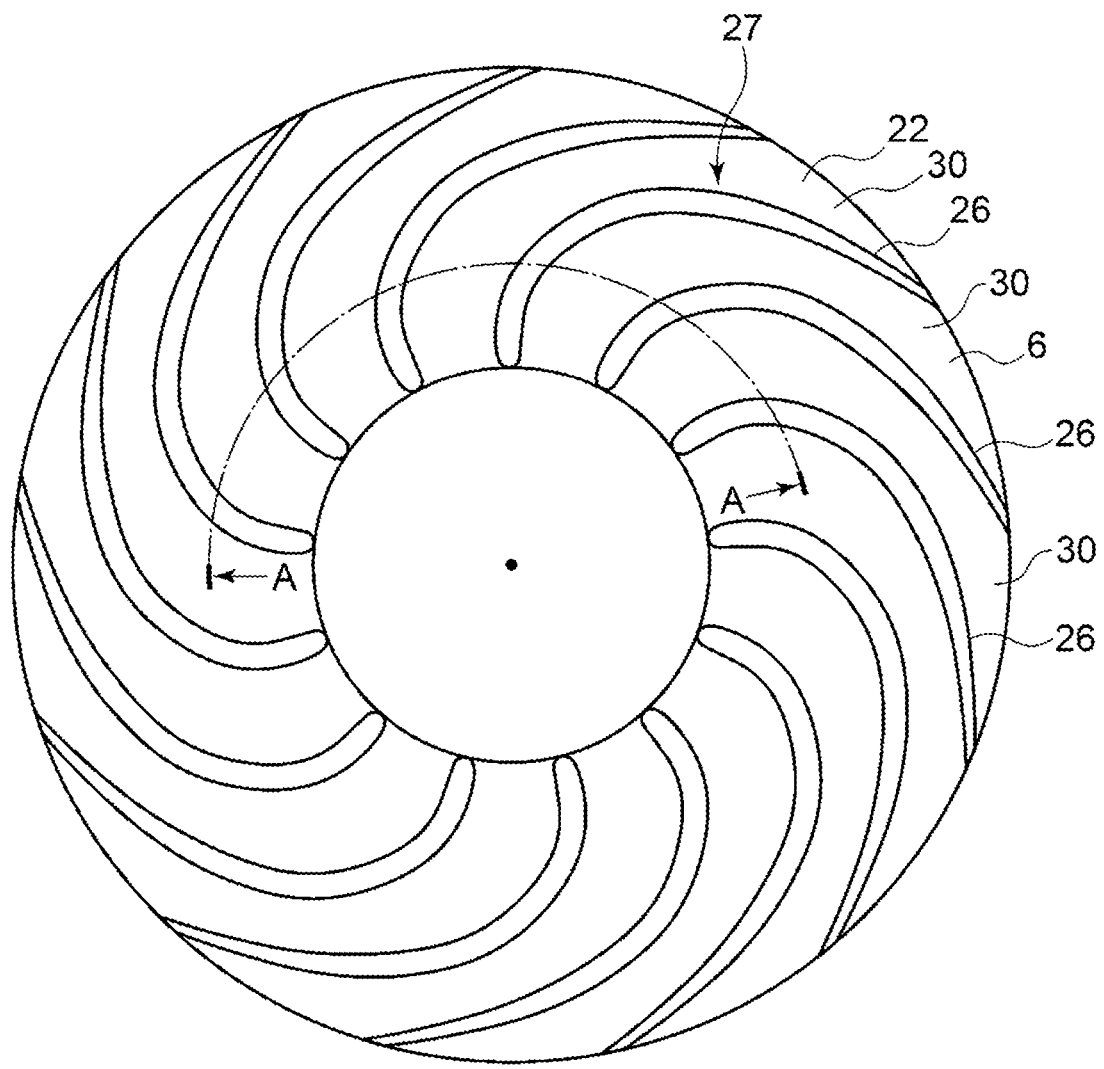
FIG. 2 is a diagram illustrating a schematic cross section orthogonal to the axial direction of a return flow path portion 22.

FIG. 2 is a diagram illustrating a schematic cross section orthogonal to the axial direction of the return flow path portion 22.

As illustrated in FIG. 1 or FIG. 2, the return flow path portion 22 is provided with a return vane row 27 (stationary blade row) including a plurality of return vanes 26 (a plurality of stationary blades) provided at intervals in the circumferential direction. Each of the return vanes 26 is supported by the casing 5. Specifically, each of the return vanes 26 is supported by at least one of a pair of flow path wall portions 22a, 22b of the casing 5 disposed opposite one another in the axial direction and forming the return flow path portion 22. The return vanes 26 has a function of counteracting the rotational component included in the fluid F by making the fluid F pressurized by the impeller 8 of the previous stage flow in the axial direction to the impeller 8 of the next stage. Note that the final stage 3F includes the diffuser flow path portion 20 provided with the diffuser vane row 29, but does not include the return flow path portion 22

In the above-described pressurizing device 2, the fluid F that has flowed into the casing 5 from the inlet 15 is pressurized by the impeller 8 furthest to the inlet 15 side, is then sequentially pressurized by the impeller 8 at each stage, up to the impeller 8 at the final stage, and is discharged from the outlet 16.

Figure 3:
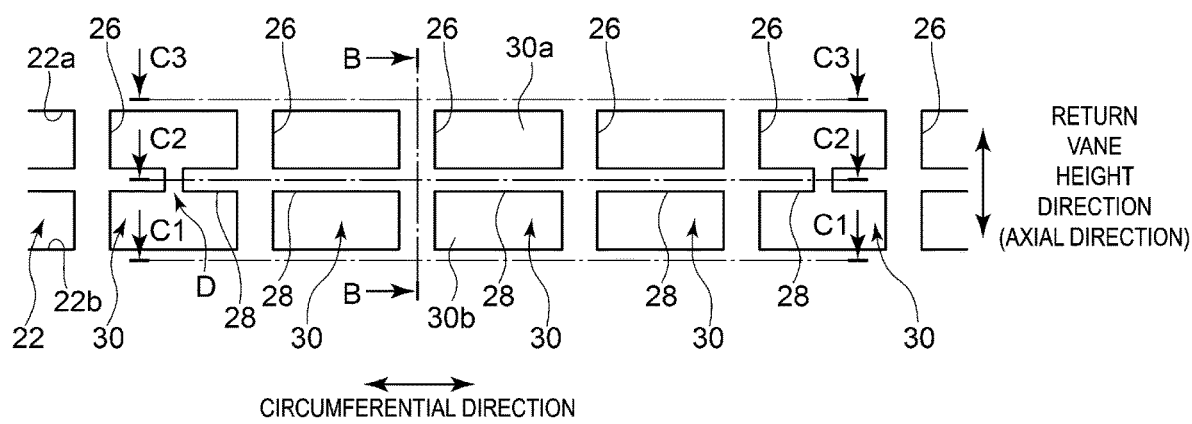
FIG. 3 is a diagram schematically illustrating an example of the configuration of a cross section A-A in FIG. 2 developed in the circumferential direction.

FIG. 3 is a diagram schematically illustrating an example of the configuration of a cross section A-A in FIG. 2 developed in the circumferential direction.

As illustrated in FIG. 3, each stage 3 of the pressurizing device 2 includes a plurality of heat exchanging units 28 for cooling the fluid F. Each of the heat exchanging units 28 is configured to divide a flow path 30 formed between two return vanes 26, of the plurality of return vanes 26, adjacent to one another in the circumferential direction in the height direction (axial direction in the example illustrated) of the return vanes 26. In the illustrated example, each of the heat exchanging units 28 is formed in a plate-like shape along the surface that intersects with the height direction of the return vanes 26. In addition, each of the heat exchanging units 28 divides the flow path 30 into a first flow path portion 30a located on one side in the height direction of the return vanes 26 (the flow path wall portion 22a side), on the other side of the heat exchanging unit 28, and a second flow path portion 30b located on the other side in the height direction of the return vanes 26 (the flow path wall portion 22b side), on the other side of the heat exchanging unit 28.

Furthermore, each of the plurality of heat exchanging units 28 is configured to connect two of the return vanes 26 adjacent to one another in the circumferential direction. However, as indicated by an arrow D in FIG. 3, at least one of the plurality of heat exchanging units 28 may be interrupted in the circumferential direction without connecting two adjacent return vanes 26. In this way, thermal deformation can be accommodated for and assembly can be made easy.

In the above-described pressurizing device 2, the rotary blade row 12, the return vane row 27, the plurality of heat exchanging units 28, and the diffuser vane row 29 constitute one stage 3.

As described above, by providing the heat exchanging units 28 configured to divide the flow path 30 formed between return vanes 26 adjacent to one another in the circumferential direction, the cross-sectional area of the flow path 30 is reduced and the equivalent diameter of the flow path 30 is reduced; and by making the boundary layer formed at the surface of the heat exchanging units 28 and the surface of the return vanes 26 thinner, the heat transfer coefficient of the surface of the heat exchanging units 28 and the surface of the return vanes 26 can be increased, and the fluid F pressurized by the pressurizing device 2 can be effectively cooled. Thus, the pressurizing of the fluid F in the pressurizing device 2 can be brought close to the isothermal compression, and the pressurizing device 2 requiring little motive power for pressurizing can be realized. Note that the effect of reducing the equivalent diameter of the flow path 30 and increasing the heat transfer coefficient of the surface of the heat exchanging units 28 or the surface of the return vanes 26; and the effect of increasing the heat transfer area can also be obtained by providing the heat exchanging units 28 so as to divide the flow path 30 in the circumferential direction, that is, providing the heat exchanging units 28 so as to extend in the radial direction parallel to the return vanes 26. However, normally. the number of the return vanes 26 provided at intervals in the circumferential direction is selected so as to minimize aerodynamic loss. When the heat exchanging units 28 are provided parallel to the return vanes 26, that is, so as to divide the flow path 30 in the circumferential direction, the heat exchanging units 28 function substantially similar to the return vanes 26, and, effectively, the number of the return vanes 26 is substantially increased. This increases aerodynamic loss and decreases efficiency. An embodiment of the disclosure is preferable because, when the heat exchanging units 28 are installed so as to divide the flow path 30 in the height direction of the return vanes 26 (plurality of stationary blades), the equivalent diameter of the flow path 30 is reduced without an increase in aerodynamic loss, and because the heat transfer coefficient of the surface of the heat exchanging units 28 and the surface of the return vanes 26 can be increased while the heat transfer area can be increased.

Figure 4:
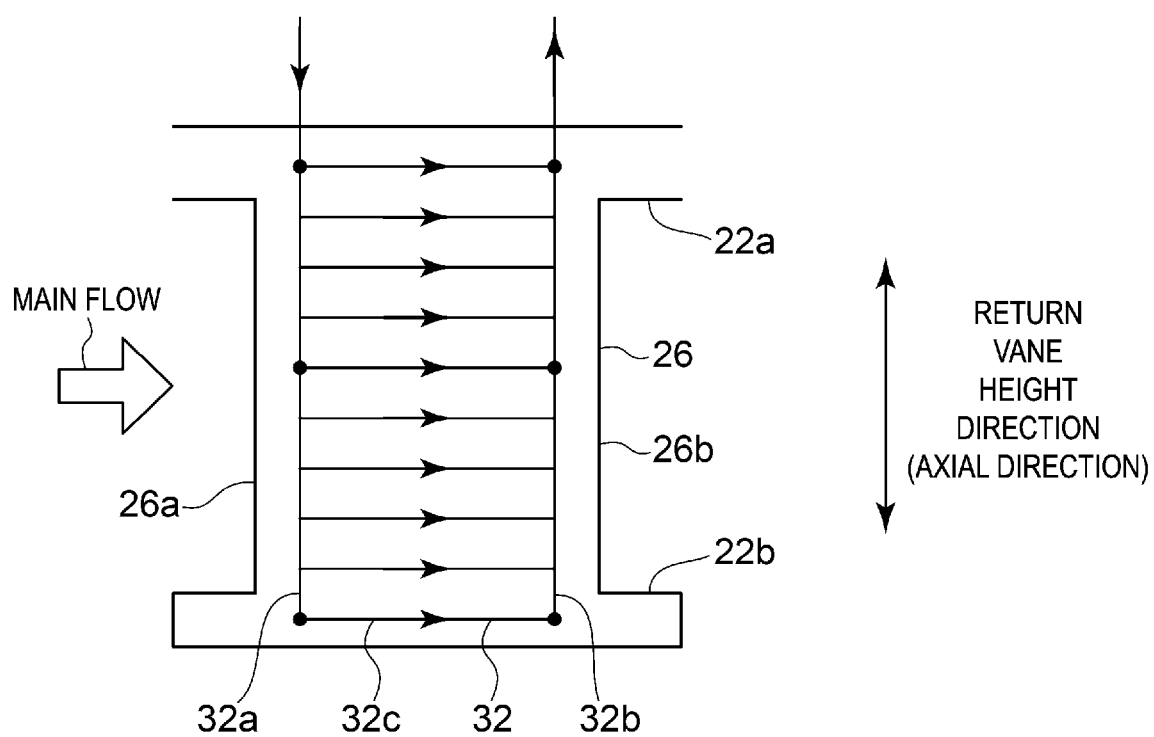
FIG. 4 is a diagram schematically illustrating an example of the configuration of a cross section B-B in FIG. 3.

FIG. 4 is a diagram schematically illustrating an example of the configuration of the cross section B-B in FIG. 3.

In some embodiments, as illustrated in FIG. 4 for example, a cooling flow path 32 through which a cooling medium (for example, water or the like) flows is formed inside the return vane 26. In the exemplary example illustrated in FIG. 4, the return vane 26 includes: a leading edge flow path portion 32a formed along the height direction of the return vane 26 on a leading edge 26a side of the return vane 26; a trailing edge flow path portion 32b formed along the height direction of the return vane 26 on a trailing edge 26b side of the return vane 26; and a plurality of connection flow path portions 32c formed connecting the leading edge flow path portion 32a and the trailing edge flow path portion 32b. The cooling medium flowing into the leading edge flow path portion 32a flows, through the plurality of connection flow path portions 32c, into the trailing edge flow path portion 32b, and is discharged from the trailing edge flow path portion 32b.

As illustrated in FIG. 4, by providing the cooling flow path 32 through which the cooling medium flows inside the return vane 26, when the fluid F pressurized by the pressurizing device 2 passes through the return vane 26, the fluid F is effectively cooled by heat exchange with the return vane 26. Thus, the pressurizing of the fluid F in the pressurizing device 2 can be brought close to the isothermal compression, and the pressurizing device 2 requiring little motive power for pressurizing can be realized.

Figure 5:
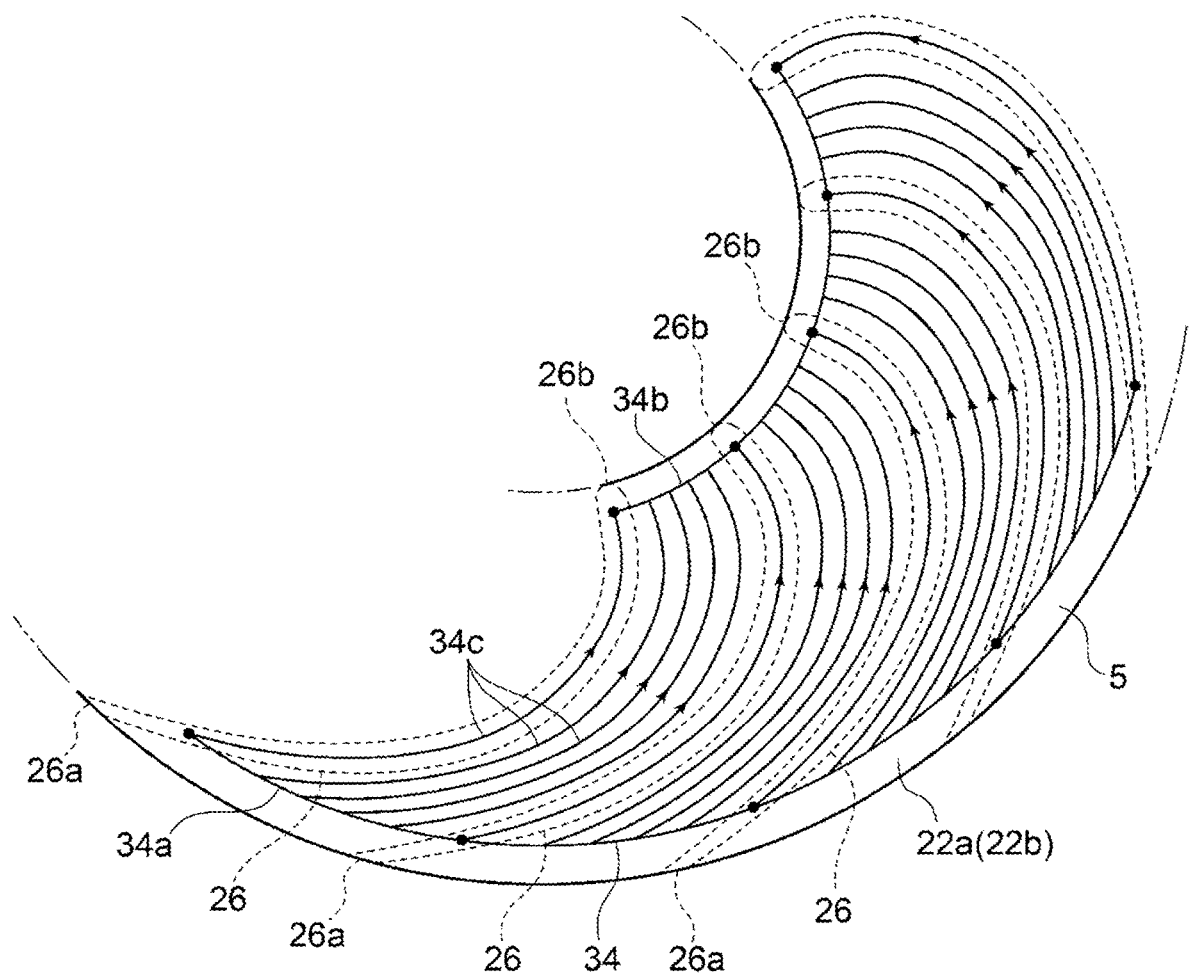
FIG. 5 is a diagram illustrating an example of the configuration of a cross section C1-C1 in FIG. 3, an example of the configuration of a cross section C2-C2, and an example of a configuration of the cross section C3-C3.

FIG. 5 is a diagram schematically illustrating an example of the configuration of a cross section C1-C1 in FIG. 3. Note that the configuration of a cross-section C2-C2 and the configuration of a cross-section C3-C3 in FIG. 3 may be similar to the configuration of the cross section C1-C1. That is, in one embodiment, FIG. 5 also illustrates an example of the configuration of the cross-section C2-C2 and the configuration of the cross-section C3-C3 in FIG. 3.

In some embodiments, as illustrated in FIG. 5 for example, a cooling flow path 34 through which a cooling medium (for example, water or the like) flows is formed inside the flow path wall portion 22a or inside the flow path wall portion 22b of the casing 5. In the exemplary example illustrated in FIG. 5, the cooling flow path 34 of the casing 5 includes: a leading edge flow path portion 34a formed along the circumferential direction on the leading edge 26a side (outer circumferential side) of the return vane 26; a trailing edge flow path portion 34b formed along the circumferential direction on the trailing edge 26b side (inner circumferential side) of the return vane 26; and a plurality of connection flow path portions 34c formed connecting the leading edge flow path portion 34a and the trailing edge flow path portion 34b. The cooling medium flowing into the leading edge flow path portion 34a flows, through the plurality of connection flow path portions 34c, into the trailing edge flow path portion 34b, and is discharged from the trailing edge flow path portion 34b.

As illustrated in FIG. 5, by providing the cooling flow path 34 through which the cooling medium flows inside the flow path wall portions 22a, 22b of the casing 5, when the fluid F pressurized by the pressurizing device 2 passes through the return vane 26, the fluid F is effectively cooled by heat exchange with the casing 5. This allows the pressurizing device 2 requiring little motive power to pressurize the fluid F to be realized.

Figure 6:
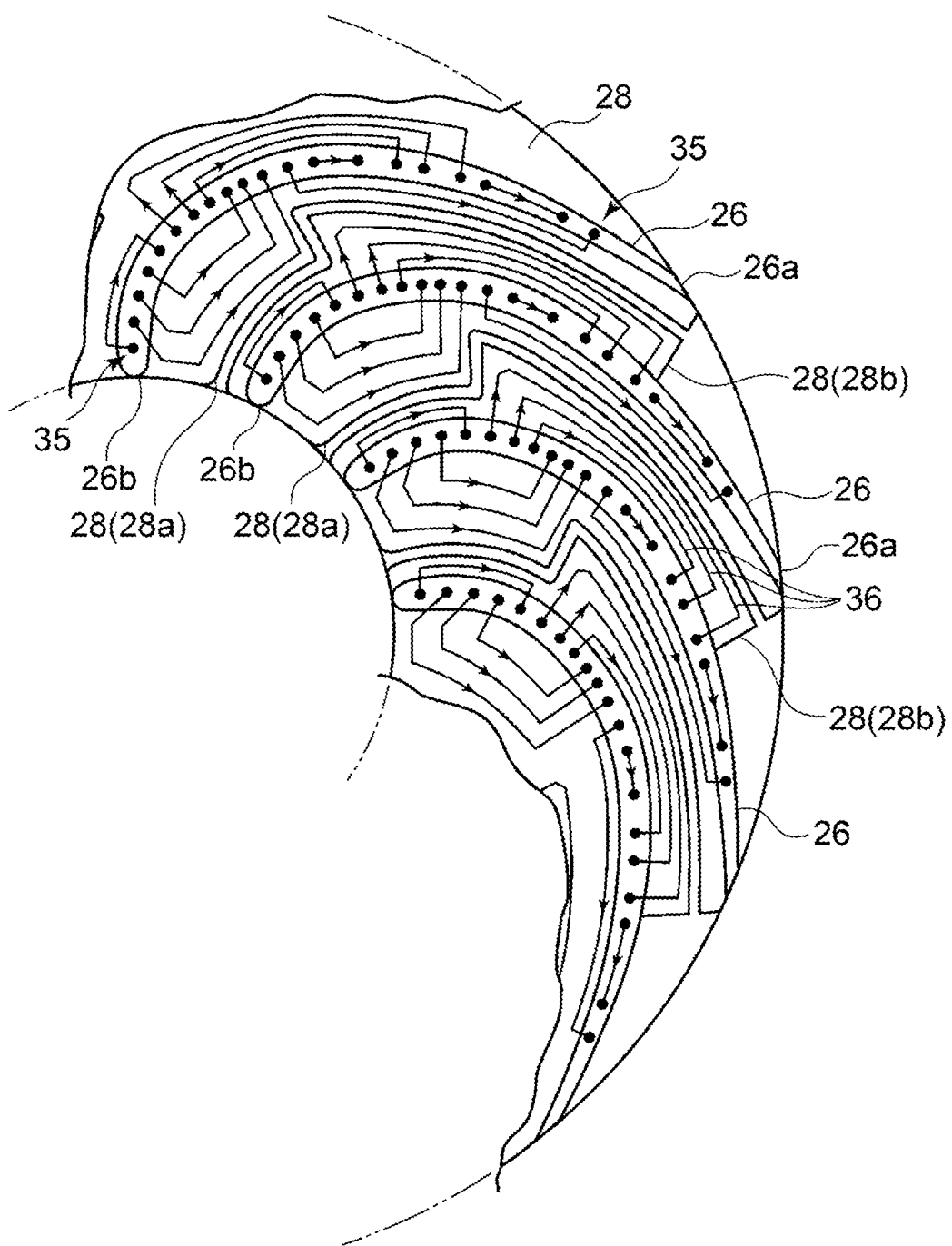
FIG. 6 is a diagram illustrating an example of the configuration of the cross section C2-C2 including a part D in FIG. 3.
Figure 7:
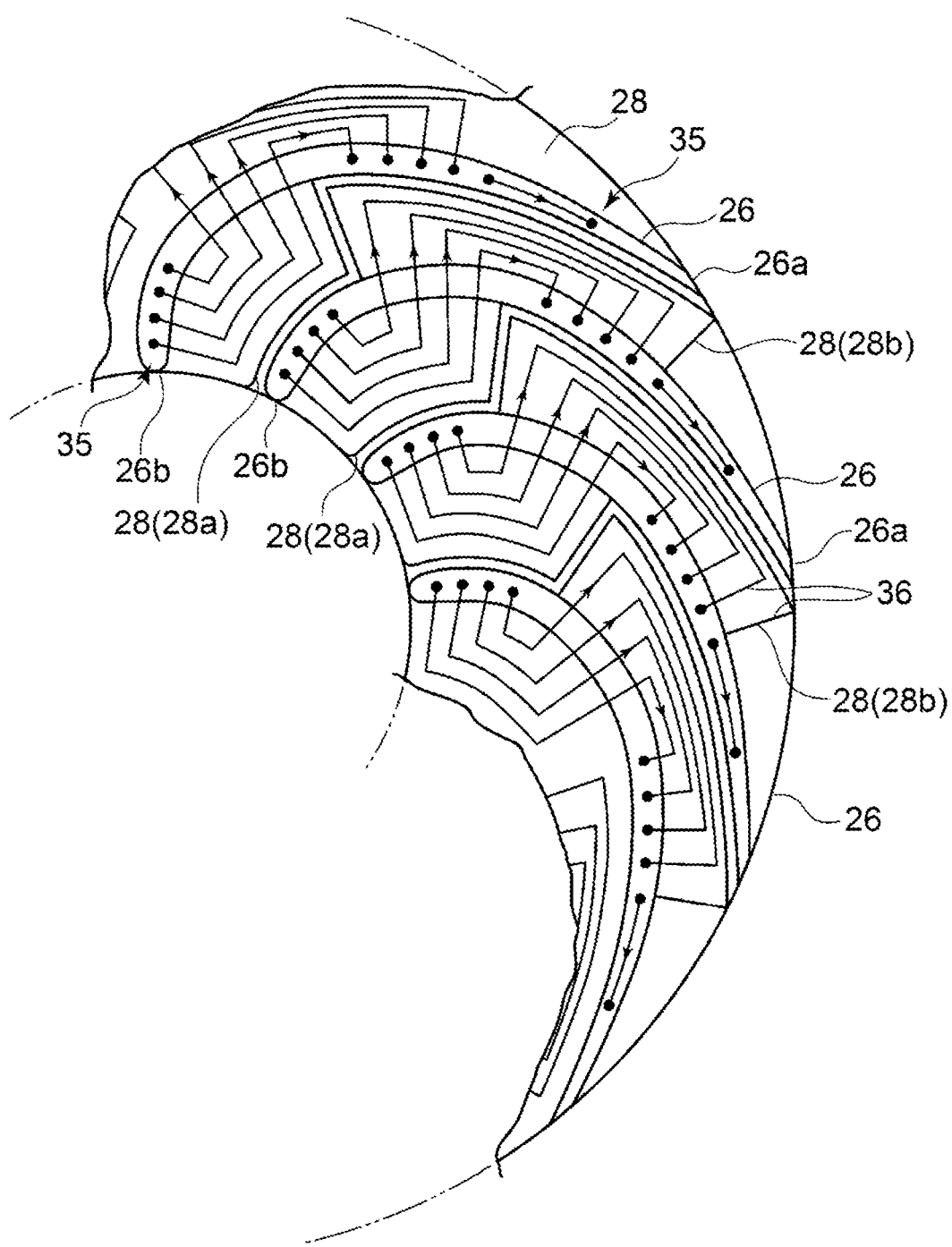
FIG. 7 is a diagram illustrating another example of the configuration of the cross section C2-C2 including the part D in FIG. 3.
Figure 8:
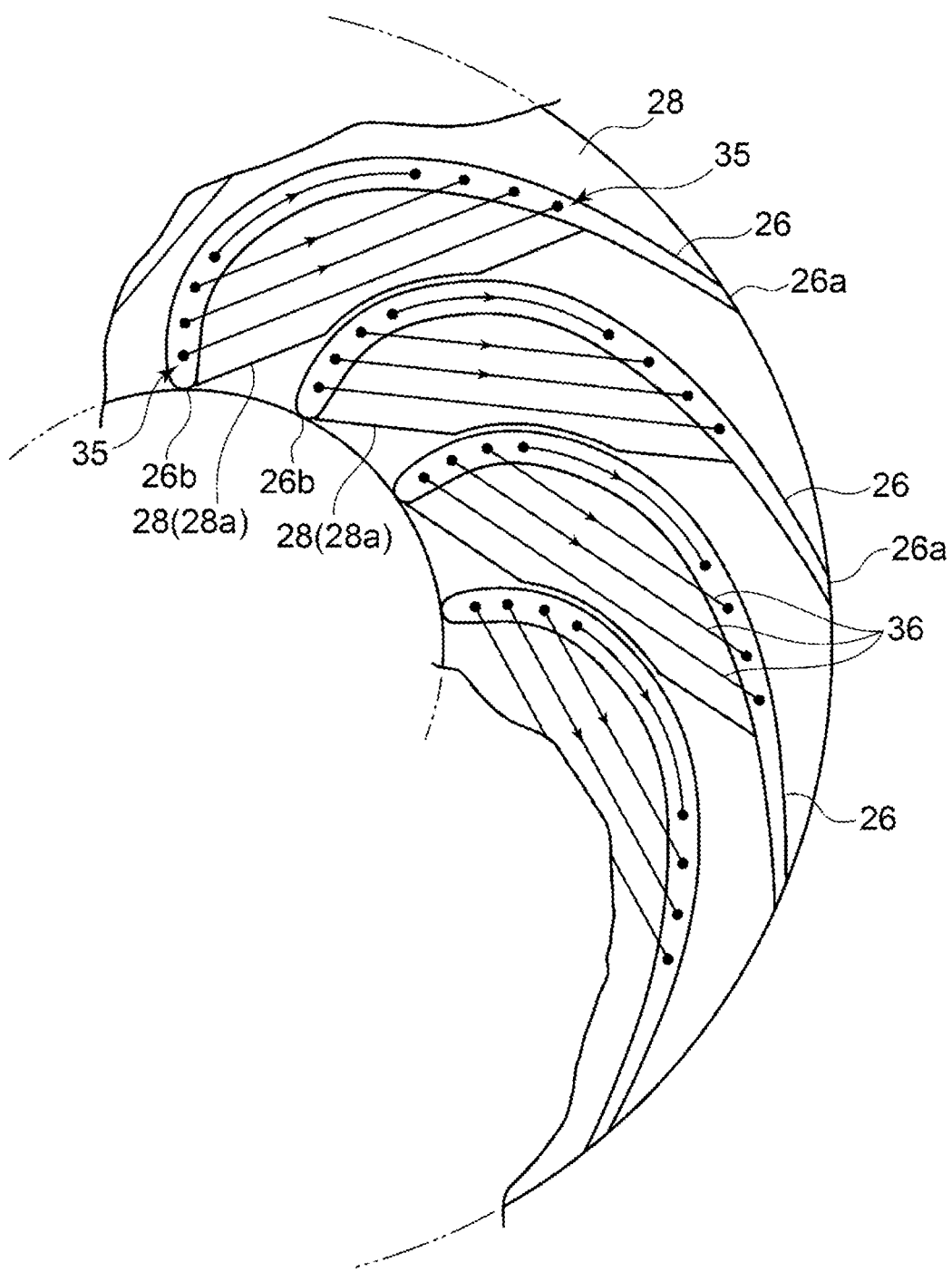
FIG. 8 is a diagram illustrating another example of the configuration of the cross section C2-C2 including the part D in FIG. 3.

Next, several examples of configurations for a part D in FIG. 3 will be described. FIG. 6 is a diagram illustrating an example of the configuration of the cross section C2-C2 including the part D in FIG. 3. FIG. 7 is a diagram illustrating another example of the configuration of the cross section C2-C2 including the part D in FIG. 3. FIG. 8 is a diagram illustrating another example of the configuration of the cross section C2-C2 including the part D in FIG. 3.

In some embodiments, as illustrated in FIGS. 6 to 8 for example, a cooling flow path 36 through which a cooling medium (for example, water or the like) flows is formed inside the heat exchanging unit 28. In the exemplary example illustrated, the cooling flow path 36 is formed connecting a plurality of cooling holes 35 that extend in the height direction of the return vane 26 inside the return vane 26.

By providing the cooling flow path 36 inside the heat exchanging unit 28, when the fluid F pressurized by the pressurizing device 2 passes through the return vane 26, the fluid F is effectively cooled by heat exchange with the heat exchanging unit 28 cooled by the cooling medium. This allows the pressurizing device 2 requiring little motive power to pressurize the fluid F to be realized.

In some embodiments, as illustrated in FIGS. 6 to 8 for example, at least one of the plurality of heat exchanging units 28 includes a first-side protruding portion 28a configured to project from a first return vane 26 of two return vanes 26 adjacent to one another in the circumferential direction toward a second return vane 26. The first-side protruding portion 28a may be provided from the leading edge 26a of the return vane 26 along to the trailing edge 26b as illustrated in FIG. 6 or may be provided in a certain range between the leading edge 26a and the trailing edge 26b of the return vane 26 as illustrated in FIGS. 7 and 8.

In some embodiments, as illustrated in FIGS. 6 and 7 for example, at least one of the plurality of heat exchanging units 28 includes a second-side protruding portion 28b configured to project from the second return vane 26 described above toward the first return vane 26 described above. The second-side protruding portion 28b may be provided from the leading edge 26a of the return vane 26 along to the trailing edge 26b or may be provided in a certain range between the leading edge 26a and the trailing edge 26b of the return vane 26 as illustrated in FIGS. 6 and 7.

Figure 9:
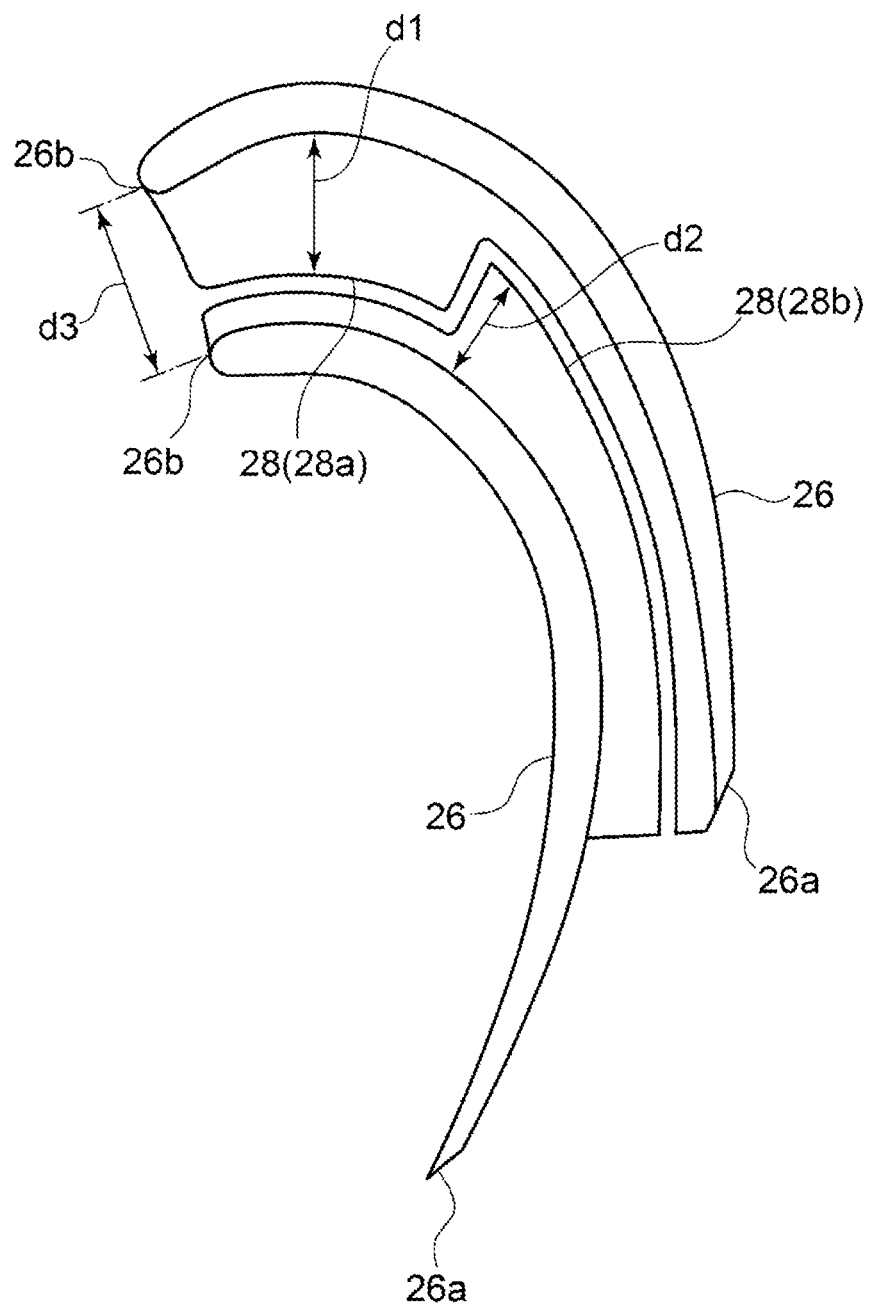
FIG. 9 is an enlarged schematic diagram of a first-side protruding portion 28a and a second-side protruding portion 28b illustrated in FIG. 6.

FIG. 9 is an enlarged schematic diagram of the first-side protruding portion 28a and the second-side protruding portion 28b illustrated in FIG. 6.

In some embodiments, as illustrated in FIG. 9, for example, a projection amount of the first-side protruding portion 28a projecting from the first return vane 26 described above toward the second return vane 26 described above is defined as d1, a projection amount of the second-side protruding portion 28b projecting from the second return vane 26 described above toward the first return vane 26 described above is defined as d2, a distance between the trailing edge 26b of the first return vane 26 and the trailing edge 26b of the second return vane 26 is defined as d3, and d1+d2>d3 is satisfied. In this way, the fluid F flowing between the return vanes 26 adjacent in the circumferential direction is less likely to pass through the first-side protruding portion 28a and the second-side protruding portion 28b in the height direction of the return vanes 26, allowing the fluid F to be effectively cooled.

Next, an axial flow pressurizing device 2 (2B) will be described using FIGS. 10 to 16.

Figure 10:
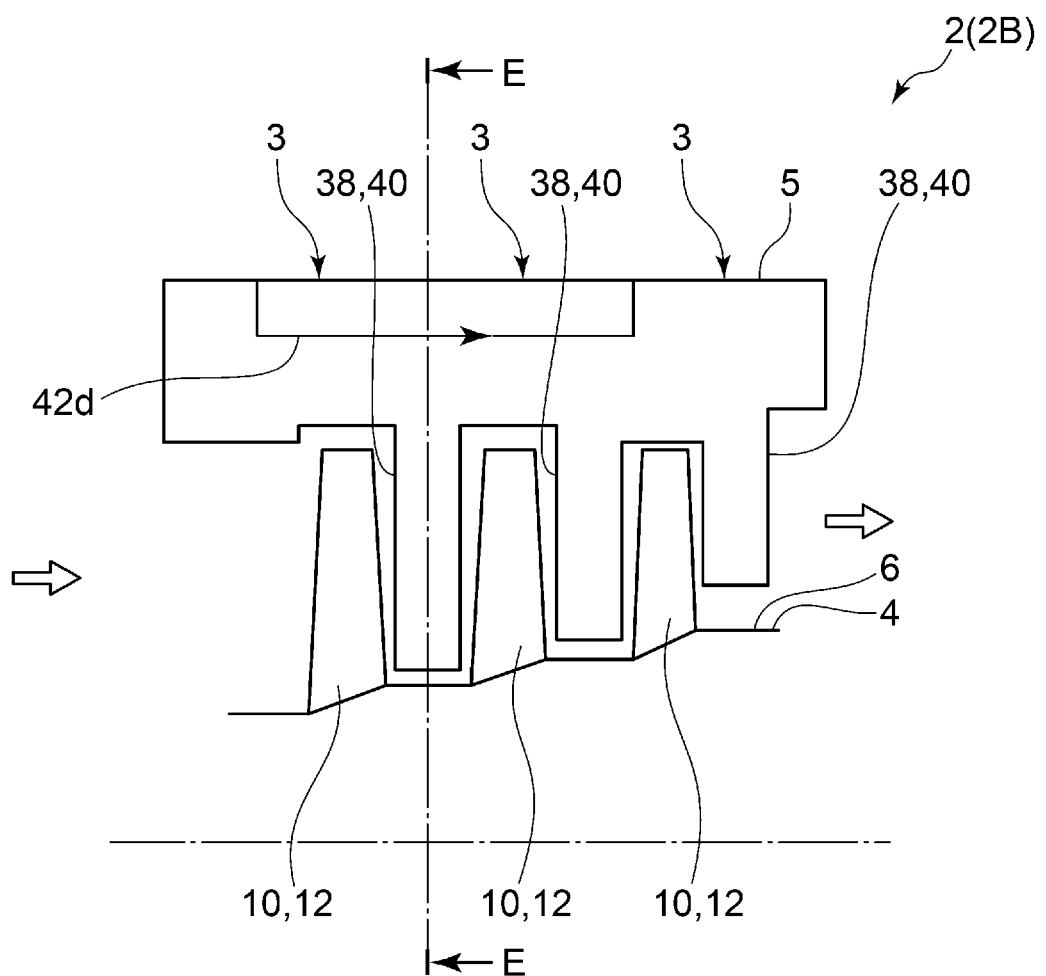
FIG. 10 is a cross-sectional view illustrating a schematic configuration of a pressurizing device 2 (2B) according to an embodiment.

FIG. 10 is a cross-sectional view illustrating a schematic configuration of the pressurizing device 2 (2B) according to an embodiment.

The exemplary pressurizing device 2 (2B) illustrated in FIG. 10 is an axial flow type and a non-positive displacement type of pressurizing device and includes the plurality of stages 3 arranged in series in the flow direction of the fluid F to be pressurized. The pressurizing device 2 (2B) includes the rotor 4 for pressurizing the fluid F and the casing 5 that houses the rotor 4. A cooling flow path 42d through which a cooling medium (for example, water or the like) flows is formed inside the casing 5.

The rotor 4 includes the shaft 6 and the rotary blade row 12 including the plurality of rotary blades 10 provided at intervals in the circumferential direction on the outer circumferential side of the shaft 6. In the example illustrated, a plurality of the rotary blade rows 12 are disposed in the axial direction on the outer circumferential surface of the shaft 6.

The casing 5 supports a vane row 40 (stationary blade row) including a plurality of vanes 38 (stationary blades) provided at intervals in the circumferential direction. In the example illustrated, a plurality of the vane rows 40 are arranged in the axial direction, and each of the vane rows 40 is disposed downstream of each of the rotary blade rows 12. In other words, the rotary blade rows 12 and the vane rows 40 are alternately disposed in the axial direction.

Figure 11:
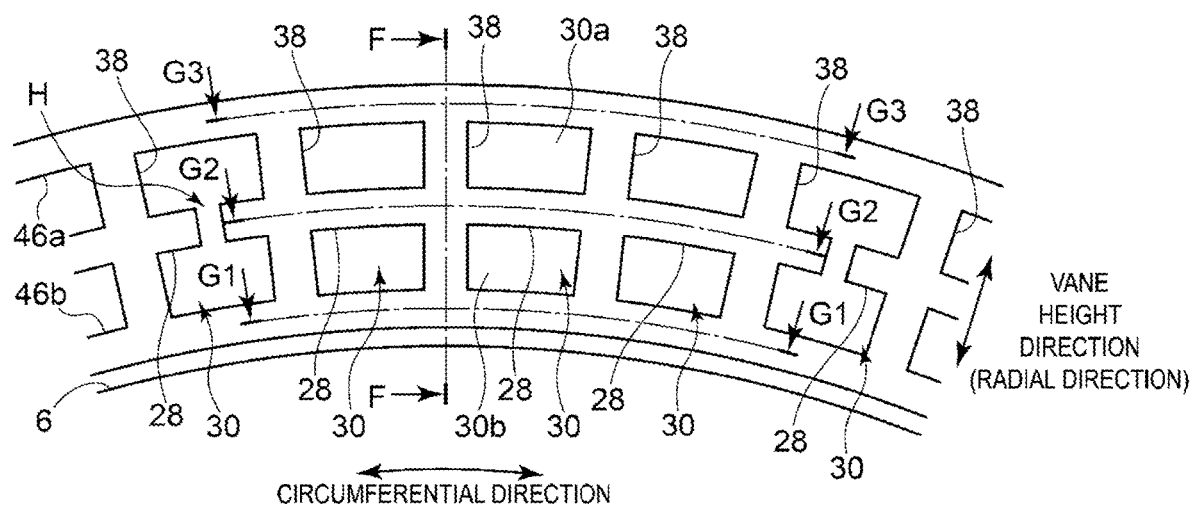
FIG. 11 is a diagram schematically illustrating a cross-section E-E of FIG. 10.

FIG. 11 is a diagram schematically illustrating a cross-section E-E of FIG. 10.

As illustrated in FIG. 11, the pressurizing device 2 includes the plurality of heat exchanging units 28 for cooling the fluid F to be pressurized. Each of the heat exchanging units 28 is configured to divide the flow path 30 formed between two vanes 38, of the plurality of vanes 38, adjacent to one another in the circumferential direction in the height direction (radial direction in the example illustrated) of the vanes 38. In the illustrated example, each of the heat exchanging units 28 is formed in a plate-like shape along the surface that intersects with the height direction of the vanes 38. In addition, each of the heat exchanging units 28 divides the flow path 30 into the first flow path portion 30a located on one side in the height direction of the vanes 38 (an outer shroud 46a side of the casing 5), on the other side of the heat exchanging unit 28, and the second flow path portion 30b located on the other side in the height direction of the vanes 38 (an inner shroud 46b side of the casing 5), on the other side of the heat exchanging unit 28.

Furthermore, each of the plurality of heat exchanging units 28 is configured to connect two of the vanes 38 adjacent to one another in the circumferential direction. However, as indicated by an arrow H in FIG. 11, at least one of the plurality of heat exchanging units 28 may be interrupted in the circumferential direction without connecting two vanes 38 adjacent in the circumferential direction. In this way, thermal deformation can be accommodated for and assembly can be made easy. In the above-described pressurizing device 2 (2B), the rotary blade row 12, the vane row 40, and the plurality of heat exchanging units 28 constitute one stage 3.

In this way, the casing 5 is cooled by a cooling medium (for example, water or the like) flowing through the cooling flow path 42d inside the casing 5. In addition, the heat conduction allows the casing 5 to cool the vane 38 and the vane 38 to cool the heat exchanging unit 28. The casing 5, the vane 38, and the heat exchanging unit 28 exchange heat with the fluid F via heat transfer, cooling the fluid F. Furthermore, by providing the heat exchanging units 28 configured to divide the flow path 30 formed between two vanes 38 adjacent to one another in the circumferential direction, the cross-sectional area of the flow path 30 is reduced and the equivalent diameter of the flow path 30 is reduced; and by making the boundary layer formed at the surface of the heat exchanging units 28 and the surface of the vanes 38 thinner, the heat transfer coefficient of the surface of the heat exchanging units 28 and the surface of the vanes 38 can be increased, and the fluid F pressurized by the pressurizing device 2 can be effectively cooled. Thus, the pressurizing of the fluid F in the pressurizing device 2 can be brought close to the isothermal compression, and the pressurizing device 2 requiring little motive power for pressurizing can be realized.

Figure 12:
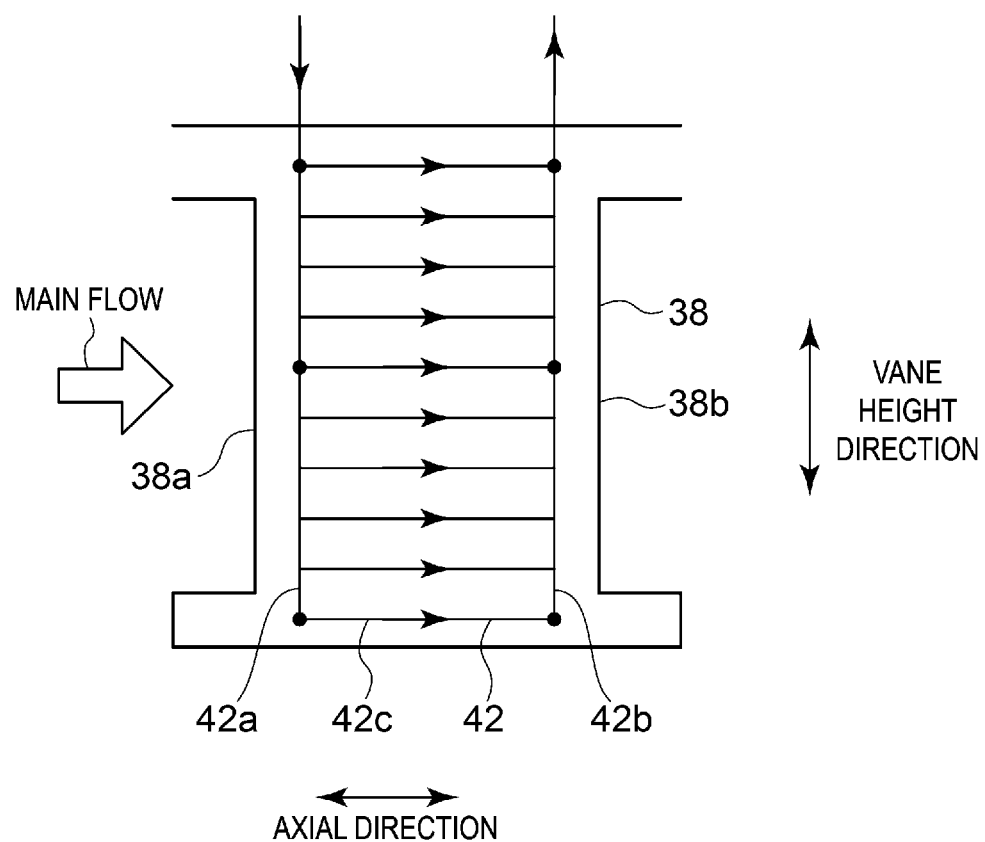
FIG. 12 is a diagram schematically illustrating an example of the configuration of a cross section F-F in FIG. 11.

FIG. 12 is a diagram schematically illustrating an example of the configuration of a cross section F-F in FIG. 11.

In some embodiments, as illustrated in FIG. 12 for example, a cooling flow path 42 through which a cooling medium (for example, water or the like) flows is formed inside the vane 38. In the exemplary example illustrated in FIG. 12, the vane 38 includes: a leading edge flow path portion 42a formed along the height direction of the vane 38 on a leading edge 38a side of the vane 38; a trailing edge flow path portion 42b formed along the height direction of the vane 38 on a trailing edge 38b side of the vane 38; and a plurality of connection flow path portions 42c formed connecting the leading edge flow path portion 42a and the trailing edge flow path portion 42b. The cooling medium flowing into the leading edge flow path portion 42a flows, through the plurality of connection flow path portions 42c, into the trailing edge flow path portion 42b, and is discharged from the trailing edge flow path portion 42b.

As illustrated in FIG. 12, by providing the cooling flow path 42 through which the cooling medium flows inside the vane 38, when the fluid F pressurized by the pressurizing device 2 passes through the vane 38, the fluid F is effectively cooled by heat exchange with the vane 38. This allows the pressurizing device 2 requiring little motive power to pressurize the fluid F to be realized.

Figure 13:
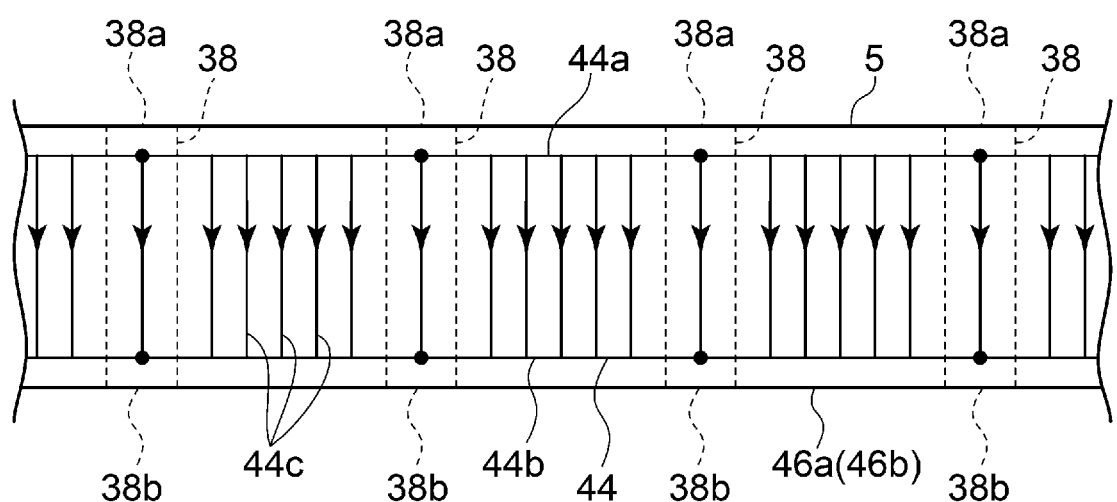
FIG. 13 is a diagram illustrating an example of the configuration of a cross section G1-G1 in FIG. 11, an example of the configuration of a cross section G2-G2, and an example of the configuration of a cross section G3-G3.

FIG. 13 is a diagram schematically illustrating an example of the configuration of a cross section G1-G1 in FIG. 11. Note that the configuration of a cross-section G2-G2 and the configuration of a cross-section G3-G3 in FIG. 11 may be similar to the configuration of the cross section G1-G1. That is, in one embodiment, FIG. 13 also illustrates an example of the configuration of the cross-section G2-G2 and the configuration of the cross-section G3-G3 in FIG. 11.

In some embodiments, as illustrated in FIG. 13 for example, a cooling flow path 44 through which a cooling medium (for example, water or the like) flows is formed inside the outer shroud 46a and inside the inner shroud 46b of the casing 5. In the exemplary example illustrated in FIG. 13, the cooling flow path 44 of the casing 5 includes: a leading edge flow path portion 44a formed along the circumferential direction on the leading edge 38a side of the vane 38; a trailing edge flow path portion 44b formed along the circumferential direction on the trailing edge 38b of the vane 38; and a plurality of connection flow path portions 44c formed connecting the leading edge flow path portion 44a and the trailing edge flow path portion 44b. The cooling medium flowing into the leading edge flow path portion 44a flows, through the plurality of connection flow path portions 44c, into the trailing edge flow path portion 44b, and is discharged from the trailing edge flow path portion 44b.

As illustrated in FIG. 13, by providing the cooling flow path 44 through which the cooling medium flows inside the outer shroud 46a and inside the inner shroud 46b of the casing 5, when the fluid F pressurized by the pressurizing device 2 passes through the vane 38, the fluid F is effectively cooled by heat exchange with the casing 5. This allows the pressurizing device 2 requiring little motive power to pressurize the fluid F to be realized.

Figure 14:
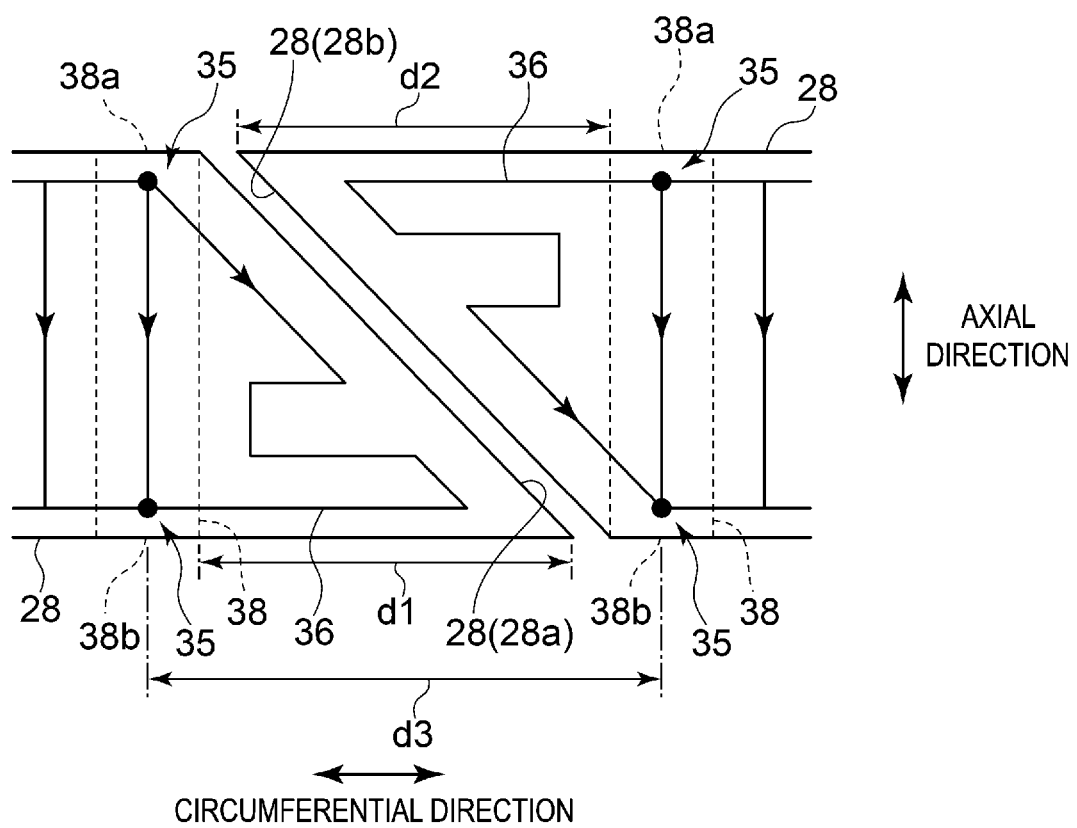
FIG. 14 is a diagram illustrating an example of the configuration of the cross section G2-G2 including a part H in FIG. 11.
Figure 15:
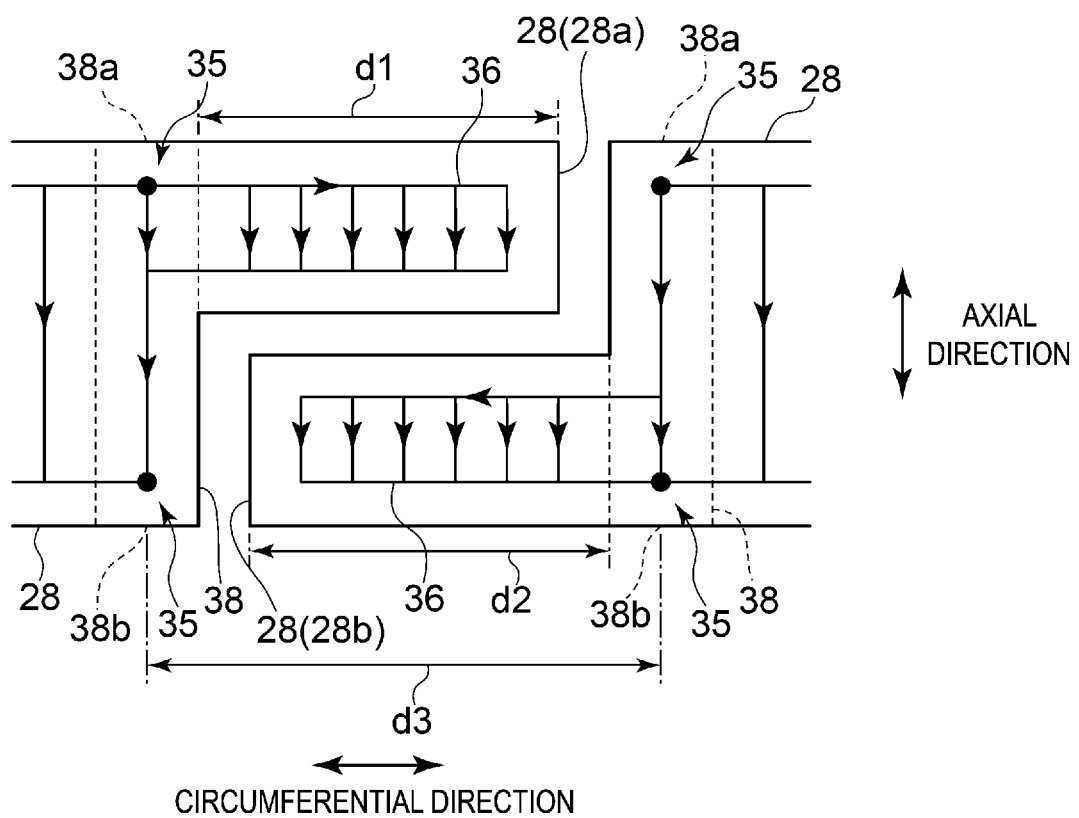
FIG. 15 is a diagram illustrating another example of the configuration of the cross section G2-G2 including the part H in FIG. 11.
Figure 16:
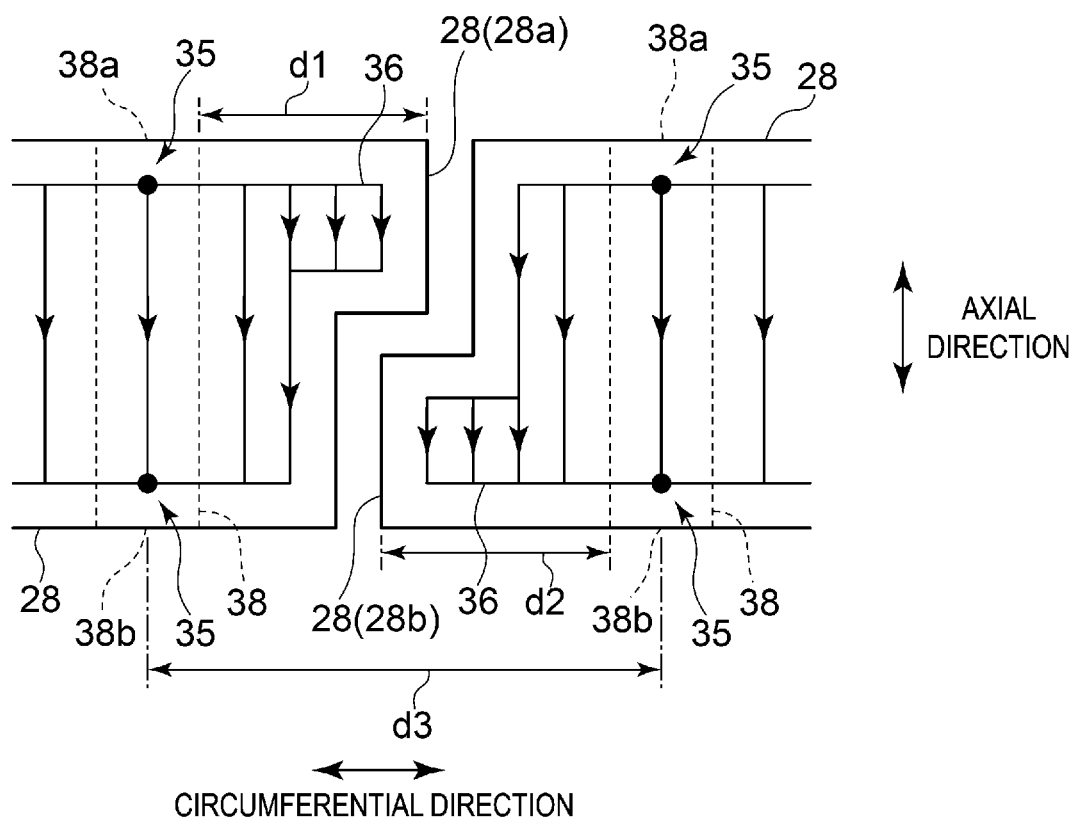
FIG. 16 is a diagram illustrating another example of the configuration of the cross section G2-G2 including the part H in FIG. 11.

Next, several examples of configurations for a part H in FIG. 11 will be described. FIG. 14 is a diagram illustrating an example of the configuration of the cross section G2-G2 including the part H in FIG. 11. FIG. 15 is a diagram illustrating another example of the configuration of the cross section G2-G2 including the part H in FIG. 11. FIG. 16 is a diagram illustrating another example of the configuration of the cross section G2-G2 including the part H in FIG. 11.

In some embodiments, as illustrated in FIGS. 14 to 16 for example, the cooling flow path 36 through which a cooling medium (for example, water or the like) flows is formed inside the heat exchanging unit 28. In the exemplary example illustrated, the cooling flow path 36 is formed connecting the plurality of cooling holes 35 that extend in the height direction of the vane 38 inside the vane 38.

By providing the cooling flow path 36 inside the heat exchanging unit 28, when the fluid F pressurized by the pressurizing device 2 passes through the vane 38, the fluid F is effectively cooled by heat exchange with the heat exchanging unit 28 cooled by the cooling medium. This allows the pressurizing device 2 requiring little motive power to pressurize the fluid F to be realized.

In some embodiments, as illustrated in FIGS. 14 to 16 and 22 for example, at least one of the plurality of heat exchanging units 28 includes the first-side protruding portion 28a configured to project from a first vane 38, of two vanes 38 adjacent to one another in the circumferential direction, toward a second vane 38 and the second-side protruding portion 28b configured to project from the vane 38 toward the first vane 38. In this example, the first-side protruding portion 28a may be provided from the leading edge 38a of the vane 38 along to the trailing edge 38b as illustrated in FIGS. 14 and 16, for example, or may be provided in a certain range between the leading edge 38a and the trailing edge 38b of the vane 38 as illustrated in FIG. 15, for example. The second-side protruding portion 28b may be provided from the leading edge 38a of the vane 38 along to the trailing edge 38b as illustrated in FIGS. 14 and 16, for example, or may be provided in a certain range between the leading edge 38a and the trailing edge 38b of the vane 38 as illustrated in FIG. 15, for example.

In some embodiments, as illustrated in FIGS. 14 to 16 and 22, for example, a projection amount of the first-side protruding portion 28a projecting from the first vane 38 described above toward the second vane 38 described above is defined as d1, a projection amount of the second-side protruding portion 28b projecting from the second vane 38 described above toward the first vane 38 described above is defined as d2, a distance between the trailing edge 38b of the first vane 38 described above and the trailing edge 38b of the second vane 38 described above is defined as d3, and d1+d2>d3 is satisfied. In this way, the fluid F flowing between the vanes 38 adjacent in the circumferential direction is less likely to pass through the gap between first-side protruding portion 28a and the second-side protruding portion 28b, allowing the fluid F to be effectively cooled.

In addition, as illustrated in FIGS. 14 to 16, in the case in which the first-side protruding portion 28a and the second-side protruding portion 28b are disposed overlapped in the axial direction (flow direction), the fluid F is less likely to pass through the gap between the first-side protruding portion 28a and the second-side protruding portion 28b, allowing the fluid F to be more effectively cooled.

Figure 22:
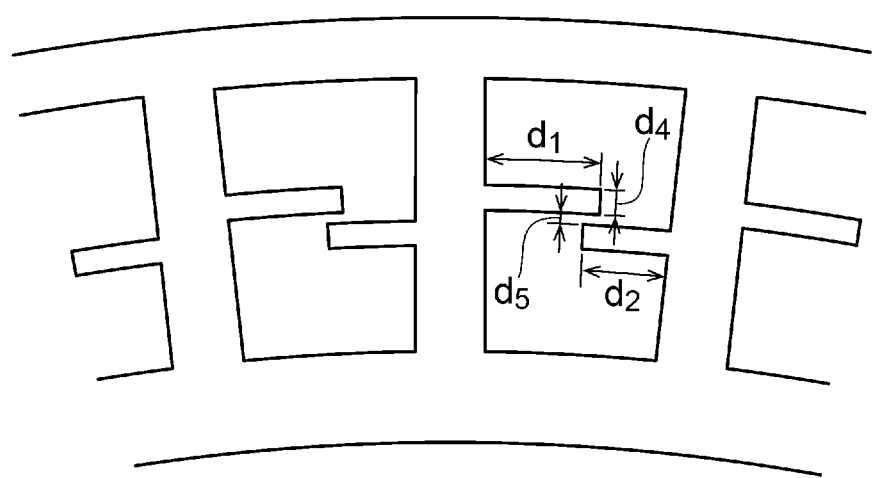
FIG. 22 is a diagram illustrating an aspect in which the first-side protruding portion 28a and the second-side protruding portion 28b are disposed overlapped in a height direction of a vane 38.

However, in the case in which it is difficult to dispose the first-side protruding portion 28a and the second-side protruding portion 28b overlapped in the axial direction (flow direction), as illustrated in FIG. 22, the first-side protruding portion 28a and the second-side protruding portion 28b can be dispose overlapped in the height direction of the vane 38. In this case, in order to effectively suppress the passage of the fluid F through the gap between the first-side protruding portion 28a and the second-side protruding portion 28b, it is preferable to reduce a gap d5 in the height direction of the vane 38 of the first-side protruding portion 28a and the second-side protruding portion 28b. Specifically, the gap d5 in the height direction of the vane 38 of the first-side protruding portion 28a and the second-side protruding portion 28b is preferably equal to or less than a thickness d4 of the first-side protruding portion 28a (d5≤d4).

Figure 17:
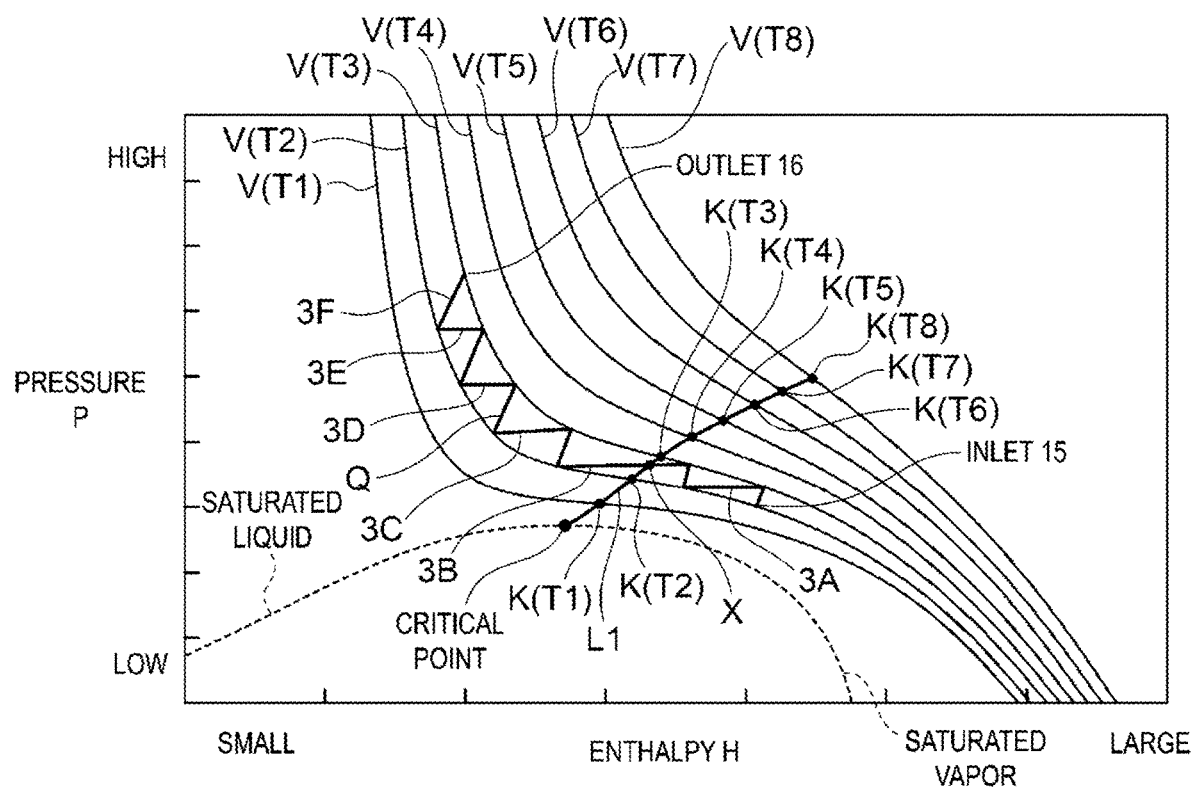
FIG. 17 is a diagram including a line Q illustrating the relationship between an enthalpy of a fluid F and a pressure of the fluid F from an inlet 15 to an outlet 16 in the pressurizing device 2(2A) from a stage 3A to a stage 3F.

FIG. 17 is a diagram including a line Q illustrating the relationship between an enthalpy H of the fluid F and a pressure P of the fluid F from the inlet 15 to the outlet 16 of the fluid F in the pressurizing device 2(2A) (from the stage 3A to the stage 3F). In FIG. 17, in addition to the line Q, enthalpy-pressure lines V indicating the relationship between the enthalpy H of the fluid F and the pressure P of the fluid F when the fluid F is isothermally compressed is illustrated for each of temperatures T1 to T8 of the fluid F.

As illustrated in FIG. 17, for each of the enthalpy-pressure lines V(T1) to V(T8), a point where the absolute value of a gradient dP/dH of the pressure P of the fluid F relating to the enthalpy H of the fluid F is the smallest is defined as a smallest gradient point K(T1) to K(T8). Then, a line connecting the smallest gradient points K(T1) to K(T8) of the enthalpy-pressure lines V(T1) to V(T8) is defined as a first line L1. Furthermore, an intersection point between the line Q and the first line L1 is defined as a first intersection point X, and the stage 3B (the stage corresponding to a portion of the line Q including the first intersection point X), corresponding to the first intersection point X, of the plurality of stages 3A to 3F is defined as a first intersection-corresponding stage 3B.

In some embodiments, for example, in the pressurizing device 2(2A) illustrated in FIG. 1, the heat exchange amount between the first intersection-corresponding stage 3B and the fluid F is greater than the heat exchange amount between the fluid F and at least one stage 3 other than the first intersection-corresponding stage 3B among the plurality of stages 3A to 3F. Also, in some embodiments, for example, in the pressurizing device 2(2A) illustrated in FIG. 1, the heat exchange amount between the first intersection-corresponding stage 3B and the fluid F is the greatest among the heat exchange amounts between the fluid F and each of the plurality of stages 3A to 3F.

By the heat exchange amount between the first intersection-corresponding stage 3B and the fluid F being greater than the heat exchange amount between the fluid F and at least one stage 3 other than the first intersection-corresponding stage 3B among the plurality of stages 3A to 3F, the fluid F can be effectively cooled in the first intersection-corresponding stage 3B where need to cool the fluid F is relatively high. This allows the pressurizing device 2(2A) requiring little motive power for pressurizing to be realized. Also, by the heat exchange amount between the first intersection-corresponding stage 3B and the fluid F being the greatest among the heat exchange amounts between the fluid F and each of the plurality of stages 3A to 3F, the fluid pressurized by the pressurizing device 2(2A) can be further effectively cooled. This allows the pressurizing device 2(2A) requiring little motive power for pressurizing to be realized.

In some embodiments, for example, in the pressurizing device 2(2A) illustrated in FIG. 1, the heat transfer area where heat exchange with the fluid F occurs in the first intersection-corresponding stage 3B is greater than the heat transfer area where heat exchange with the fluid F occurs in at least one stage 3 other than the first intersection-corresponding stage 3B among the plurality of stages 3. Also, in some embodiments, the heat transfer area where heat exchange with the fluid F occurs in the first intersection-corresponding stage 3B is the greatest among the heat transfer areas where heat exchange with the fluid F occurs in each of the plurality of stages 3A to 3F.

In this way, the fluid F can be effectively cooled in the first intersection-corresponding stage 3B where need to cool the fluid F is high. This allows the pressurizing device 2(2A) requiring little motive power for pressurizing to be realized.

In some embodiments, for example, in the pressurizing device 2(2A) illustrated in FIG. 1, the heat exchanging unit 28 is provided in the first intersection-corresponding stage 3B and the heat exchanging unit 28 is not provided in at least one stage 3 other than the first intersection-corresponding stage 3B among the plurality of stages 3.

In this way, the fluid F can be effectively cooled in the first intersection-corresponding stage 3B where need to cool the fluid F is high. This allows the pressurizing device 2(2A) requiring little motive power for pressurizing to be realized.

In particular, as illustrated in FIG. 17, in the case in which the fluid F above its critical pressure is pressurized, the stage in which the smallest gradient point is passed is often a relatively upstream stage. In a typical multi-stage pressurizing device, an upstream stage has a relatively large flow path width W (see FIG. 1). Thus, the heat transfer area where heat exchange with the fluid F occurs is small relative to the large flow path cross-sectional area, and the heat transfer efficiency is easily reduced because of the large equivalent diameter of the flow path. Therefore, effective cooling of the fluid F is difficult.

In this regard, as described above, when the heat exchanging unit 28 is provided in the stage (the first intersection-corresponding stage 3B) in which the smallest gradient point K is passed, the heat transfer area of the stage can be increased. In addition, since the heat exchanging unit is disposed so as to divide the flow path, the equivalent diameter of the flow path can be reduced and a high heat transfer coefficient can be obtained. As described above, the above-described problem can be solved, and the heat exchange amount between the stage (the first intersection-corresponding stage 3B) in which the smallest gradient point K is passed can be further effectively increased, and the pressurizing device 2(2A) requiring little motive power for pressurizing can be realized.

In some embodiments, in the pressurizing device 2(2A), the cooling flow paths 32, 34, 36 are provided in each of the plurality of stages 3, and the temperature of the cooling medium flowing through the cooling flow path 32 formed in the first intersection-corresponding stage 3B is lower than the temperature of the cooling medium flowing through the cooling flow path 32 of at least one stage 3 other than the first intersection-corresponding stage 3B among the plurality of stages 3. Also, the temperature of the cooling medium flowing through the cooling flow path 34 formed in the first intersection-corresponding stage 3B is lower than the temperature of the cooling medium flowing through the cooling flow path 34 of at least one stage 3 other than the first intersection-corresponding stage 3B among the plurality of stages 3. Also, the temperature of the cooling medium flowing through the cooling flow path 36 formed in the first intersection-corresponding stage 3B is lower than the temperature of the cooling medium flowing through the cooling flow path 36 of at least one stage 3 other than the first intersection-corresponding stage 3B among the plurality of stages 3.

In this way, the fluid F can be effectively cooled in the first intersection-corresponding stage 3B where need to cool the fluid F is high. This allows the pressurizing device 2(2A) requiring little motive power for pressurizing to be realized.

In some embodiments, in the pressurizing device 2(2A), the cooling flow paths 32, 34, 36 are provided in each of the plurality of stages 3, and the temperature of the cooling medium flowing through the cooling flow path 32 formed in the first intersection-corresponding stage 3B is the lowest among the temperatures of the cooling medium flowing through the cooling flow path 32 of each of the plurality of stages 3. Also, the temperature of the cooling medium flowing through the cooling flow path 34 formed in the first intersection-corresponding stage 3B is the lowest among the temperatures of the cooling medium flowing through the cooling flow path 34 of each of the plurality of stages 3. The temperature of the cooling medium flowing through the cooling flow path 36 formed in the first intersection-corresponding stage 3B is the lowest among the temperatures of the cooling medium flowing through the cooling flow path 36 of each of the plurality of stages 3.

In this way, the fluid F can be effectively cooled in the first intersection-corresponding stage 3B where need to cool the fluid F is high. This allows the pressurizing device 2(2A) requiring little motive power for pressurizing to be realized.

Figure 18:
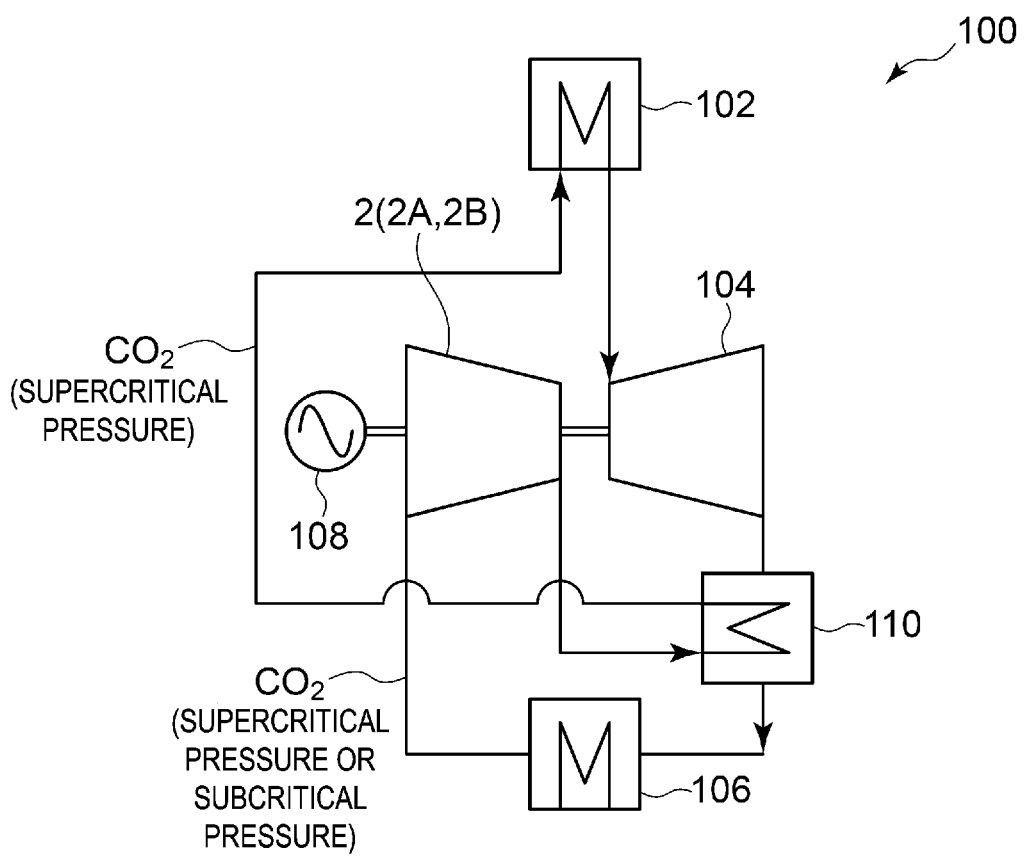
FIG. 18 is a schematic view illustrating a schematic configuration of a carbon dioxide cycle plant 100 to which the above-described pressurizing device 2(2A, 2B) can be applied.

FIG. 18 is a schematic view illustrating a schematic configuration of a carbon dioxide cycle plant 100 to which the above-described pressurizing device 2(2A, 2B) can be applied.

The carbon dioxide cycle plant 100 illustrated in FIG. 18 includes the pressurizing device 2(2A) or the pressurizing device 2 (2B), a heater 102, a turbine 104 (an expander) provided coaxially with the pressurizing device 2, and a cooler 106. In this case, the pressurizing device 2 pressurizes the carbon dioxide, which is the fluid F, to a supercritical pressure, the heater 102 heats the carbon dioxide pressurized by the pressurizing device 2, the turbine 104 expands the carbon dioxide heated by the heater 102 and extracts work, and the cooler 106 cools the carbon dioxide expanded by the turbine 104. A power generator 108 is connected to the pressurizing device 2, and the pressurizing device 2 and the power generator 108 are driven by the power obtained from the turbine 104.

In the exemplary example illustrated in FIG. 18, a recuperator 110 is provided between the pressurizing device 2 and the heater 102, and the carbon dioxide pressurized by the pressurizing device 2 is supplied to the heater 102 after the thermal energy of the exhaust gas of the turbine 104 is recovered by the recuperator 110. The exhaust gas of the turbine 104 is cooled by carbon dioxide at the recuperator 110, then supplied to the cooler 106, cooled by the cooler 106, and then supplied to the pressurizing device 2. The cooler 106 cools the exhaust gas of the turbine 104 with, for example, seawater, river water, air, or the like. Note that the cooler 106 may exchange heat with the cooling fluid and indirectly cool the cooling fluid. The heat source of the heater 102 is not particularly limited and may be, for example, electricity, or exhaust gas obtained from a prime mover, or the like.

According to the carbon dioxide cycle plant 100, by applying the pressurizing device 2, it is possible to reduce the motive power required to pressurize carbon dioxide to a supercritical pressure, allowing a highly efficient carbon dioxide cycle plant 100 to be realized.

Figure 19:
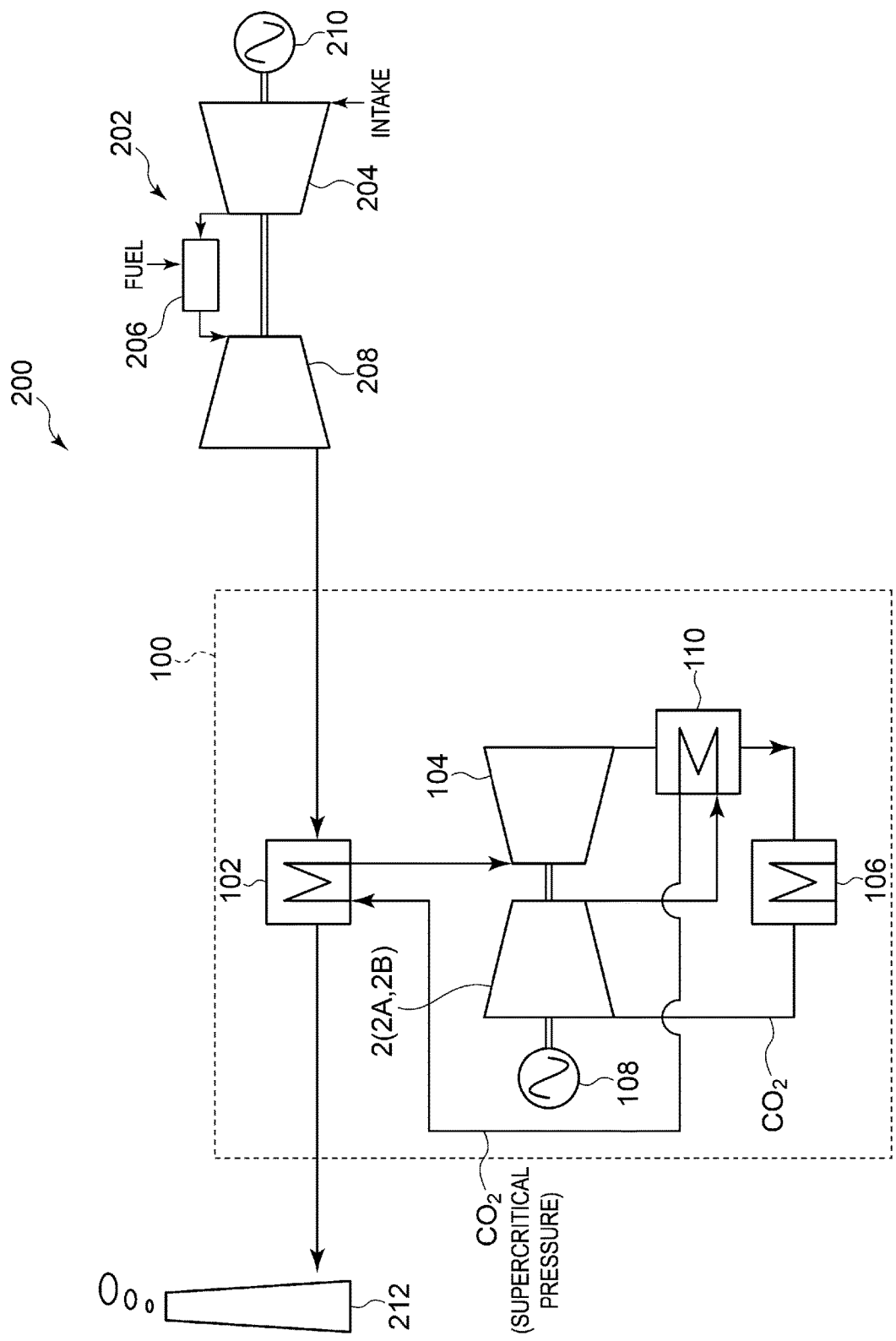
FIG. 19 is a schematic view illustrating a schematic configuration of a combined cycle plant 200 to which the carbon dioxide cycle plant 100 described above can be applied.

FIG. 19 is a schematic view illustrating a schematic configuration of a combined cycle plant 200 to which the carbon dioxide cycle plant 100 described above can be applied.

The combined cycle plant 200 illustrated in FIG. 19 includes the carbon dioxide cycle plant 100 and a gas turbine 202 as an exhaust gas generation source. In this case, the heater 102 of the carbon dioxide cycle plant 100 heats the carbon dioxide by heat exchange between the exhaust gas of the gas turbine 202 (the exhaust gas of a turbine 208 described below) and the carbon dioxide pressurized by the pressurizing device 2. The exhaust gas passing through the heater 102 is discharged from a stack 212. The gas turbine 202 includes: a compressor 204 that compresses intake; a combustor 206 that combusts fuel using compressed air compressed by the compressor 204; the turbine 208 that is rotated by the combustion gas generated by the combustor 206; and a power generator 210 that rotates with the compressor 204 and the turbine 208.

According to the combined cycle plant 200 described above, by providing the highly efficient carbon dioxide cycle plant 100, a highly efficient combined cycle plant can be realized.

Figure 20:
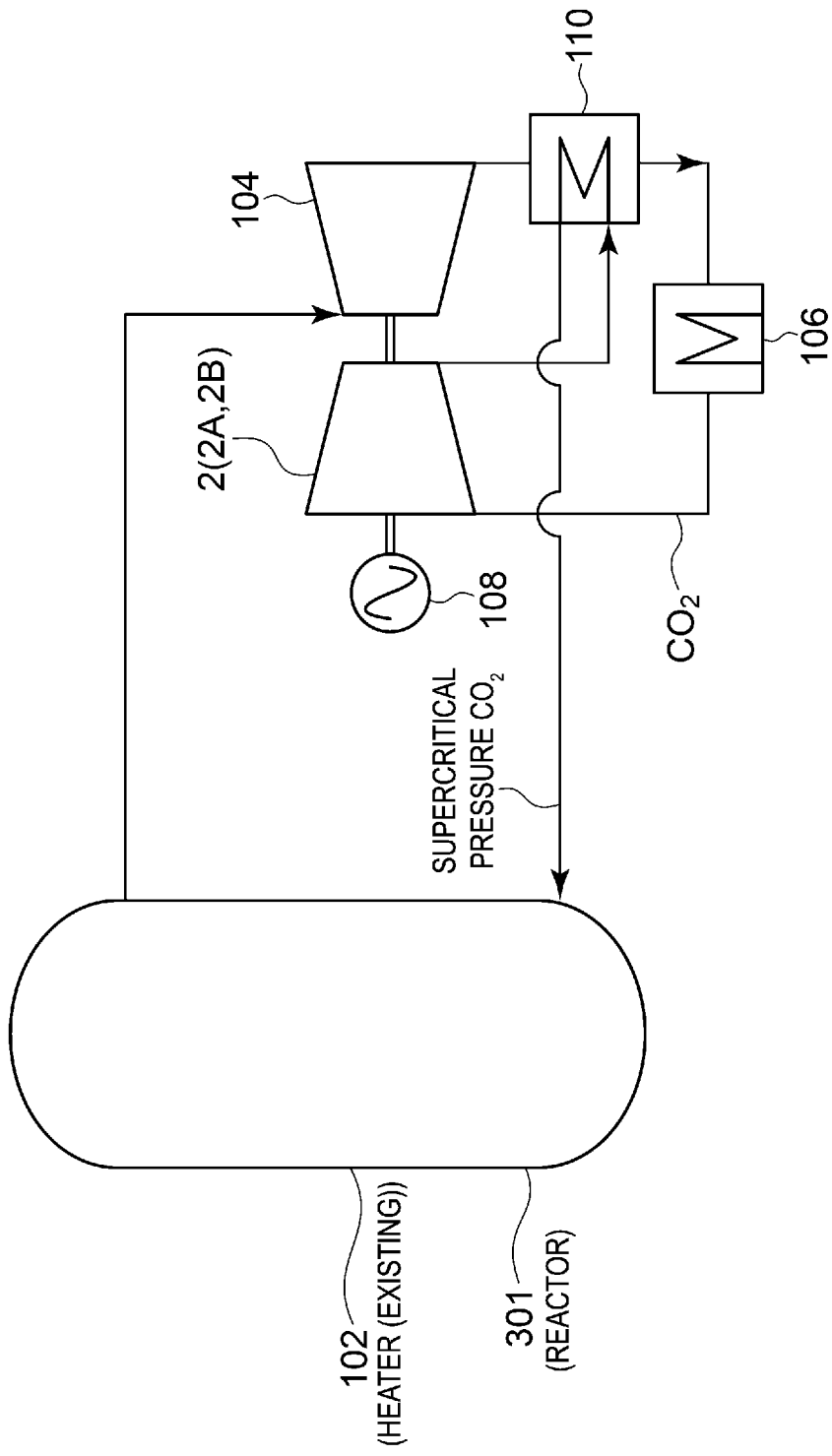
FIG. 20 is a schematic view illustrating an application example of the carbon dioxide cycle plant 100 described above.

FIG. 20 is a schematic view illustrating an application example of the carbon dioxide cycle plant 100 described above. In the present application example, in the carbon dioxide cycle plant 100, the heater 102 is provided with a reactor 301, and the carbon dioxide is heated using heat generated in the nuclear reaction in the reactor 301.

According to the present application example, the carbon dioxide pressurized by the pressurizing device can be heated using the thermal energy generated by the reactor. This allows for a highly efficient carbon dioxide cycle plant to be realized. In addition, because the carbon dioxide during pressurization can be cooled, the motive power required for pressurizing can be reduced, and a large output can be obtained from a relatively small scale reactor.

Figure 21:
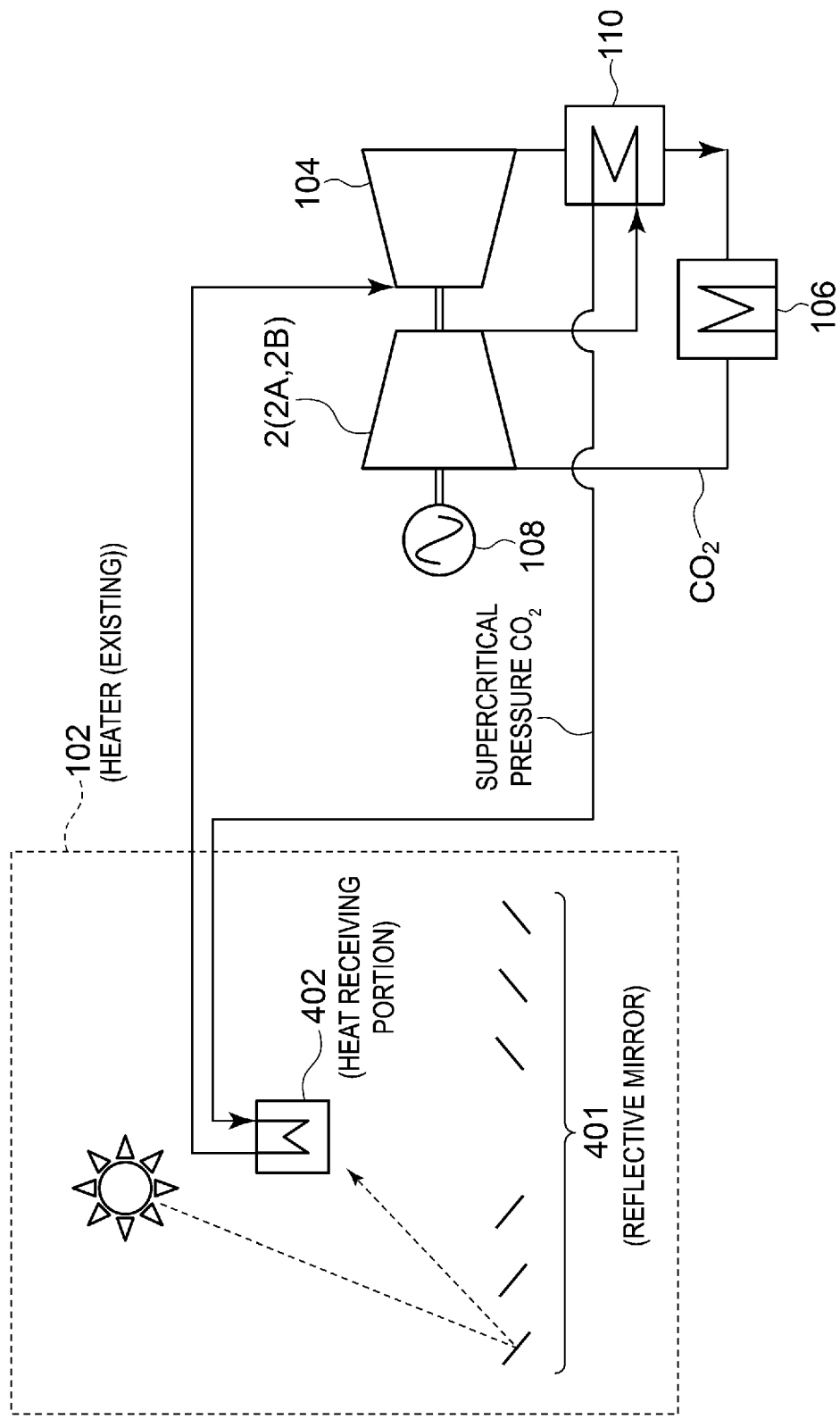
FIG. 21 is a schematic view illustrating another application example of the carbon dioxide cycle plant 100 described above.

FIG. 21 is a schematic view illustrating another application example of the carbon dioxide cycle plant 100 described above.

In the present application example, in the carbon dioxide cycle plant 100 described, the heater 102 is provided with a reflective mirror 401 and a heat receiving portion 402, and the sunlight is reflected by the reflective mirror 401 to the heat receiving portion 402 to heat the carbon dioxide in the heat receiving portion 402 by solar heat.

According to the present application example, the carbon dioxide pressurized by the pressurizing device can be heated using solar heat. This allows for a carbon dioxide cycle plant that utilizes renewable energy to be realized. In addition, because the carbon dioxide during pressurization can be cooled, the motive power required for pressurizing can be reduced, and a large output can be obtained from a relatively small scale plant.

The disclosure is not limited to the embodiments described above and also includes a modification of the above-described embodiments as well as appropriate combinations of these modes.

For example, in the pressurizing device 2 described above, the return vanes 26 and the vanes 38 are examples of stationary blades to which heat exchanging units are applied. However, the diffuser vanes 24 may be stationary blades to which heat exchanging units are applied. In this case, the heat exchanging unit is provided so as to divide the flow path formed between the diffuser vanes adjacent to each other in the circumferential direction into the height direction of the diffuser vanes.

Furthermore, in the pressurizing device 2 (2B) described above, the first-side protruding portion 28a and the second-side protruding portion 28b are disposed overlapped in the height direction of the vanes 38 (FIG. 22). However, this configuration can also be applied to the pressurizing device 2(2A).

In addition, in the combined cycle plant 200 described above, the gas turbine 202 is an example of an exhaust gas generation source that generates exhaust gas that is supplied to the heater 102. However, the exhaust gas generation source is not limited to a gas turbine, and may be another prime mover (for example, a reciprocating engine or a steam engine) or may be a fuel cell.

In addition, any one of the pressurizing device 2(2A) and the pressurizing device 2 (2B) can be applied to the carbon dioxide cycle plant 100 of FIGS. 18, 20, 21 and the combined cycle plant 200 of FIG. 19.

Furthermore, the configuration according to the first intersection-corresponding stage 3B described using FIG. 17 is not limited to the pressurizing device 2(2A) and may also be applied to the pressurizing device 2 (2B).

The details described in each embodiment can be understood as follows, for example.

(1) A pressurizing device (2A, 2B) according to the disclosure is a non-positive displacement type pressurizing device for pressurizing a fluid, comprising:

a rotor (4) including a rotary blade row (12) including a plurality of rotary blades (10) provided at intervals in a circumferential direction;

a casing (5) that accommodates the rotor;

a stationary blade row (27, 29, 40) supported by the casing and including a plurality of stationary blades (24, 26, 38) provided at intervals in the circumferential direction; and a plurality of heat exchanging units (28) for cooling the fluid, wherein the heat exchanging units are configured to divide a flow path (30) formed between stationary blades, of the plurality of stationary blades, adjacent to one another in the circumferential direction in a height direction of the stationary blades.

According to the pressurizing device of (1) described above, by providing the heat exchanging units configured to divide the flow path formed between the stationary blades adjacent to one another, the cross-sectional area of the flow path is reduced and the equivalent diameter of the flow path is reduced; and by making the boundary layer formed at the surface of the heat exchanging units and the surface of the stationary blades thinner, the heat transfer coefficient of the surface of the heat exchanging units and the surface of the stationary blades can be increased, and the fluid pressurized by the pressurizing device can be effectively cooled. Thus, a pressurizing device requiring little motive power to pressurize a fluid can be realized.

(2) In some embodiments, in the pressurizing device according to (1) described above, a cooling flow path (34, 44) through which a cooling medium flows is formed inside the casing.

According to the pressurizing device of (2) described above, since the fluid pressurized by the pressurizing device is effectively cooled by heat exchange with the casing, a pressurizing device requiring little motive power to pressurize the fluid can be realized.

(3) In some embodiments, in the pressurizing device according to (1) or (2) described above, a cooling flow path (32, 42) through which a cooling medium flows is formed inside the stationary blades.

According to the pressurizing device of (3) described above, since the fluid pressurized by the pressurizing device is effectively cooled by heat exchange with the stationary blade when the fluid passes through the stationary blade, a pressurizing device requiring little motive power to pressurize the fluid can be realized.

(4) In some embodiments, in the pressurizing device according to any one of (1) to (3) described above, a cooling flow path (36) through which a cooling medium flows is formed inside the heat exchanging units.

According to the pressurizing device of (4) described above, when the fluid pressurized by the pressurizing device passes through the stationary blade, since the fluid is effectively cooled by heat exchange with the heat exchanging units cooled by the cooling medium, a pressurizing device requiring little motive power to pressurize the fluid can be realized.

(5) In some embodiments, in the pressurizing device according to any one of (1) to (4) described above, at least one of the plurality of heat exchanging units is configured to connect the stationary blades together, of the plurality of stationary blades, adjacent to one another in the circumferential direction.

According to the pressurizing device of (5) described above, the flow path formed between the stationary blades adjacent to one another can be effectively divided in the height direction of the stationary blades. Thus, the effect obtained by the configuration described in (1) can be increased, and the motive power required to pressurize the fluid can be effectively reduced.

(6) In some embodiments, in the pressurizing device according to any one of (1) to (5) described above, at least one of the plurality of heat exchanging units includes a first-side protruding portion (28a) configured to project from a first stationary blade of the stationary blades adjacent to one another toward a second stationary blade, and a second-side protruding portion (28b) configured to project from the second stationary blade toward the first stationary blade; and a projection amount of the first-side protruding portion projecting from the first stationary blade toward the second stationary blade is defined as d1, a projection amount of the second-side protruding portion projecting from the second stationary blade toward the first stationary blade is defined as d2, a distance between a trailing edge of the first stationary blade and a trailing edge of the second stationary blade is defined as d3, and d1+d2>d3 is satisfied.

According to the pressurizing device of (6) described above, the fluid flowing between the stationary blades adjacent to one another in the circumferential direction is less likely to pass through the first-side protruding portion and the second-side protruding portion in the height direction of the stationary blades, and the fluid can be effectively cooled.

(7) In some embodiments, in the pressurizing device according to any one of (1) to (6) described above, the pressurizing device is a centrifugal pressurizing device (2A).

According to the pressurizing device of (7) described above, motive power required to pressurize the fluid in the centrifugal pressurizing device can be reduced.

(8) In some embodiments, in the pressurizing device according to any one of (1) to (6) described above, the pressurizing device is an axial flow pressurizing device (2B).

According to the pressurizing device of (8) described above, motive power required to pressurize the fluid in the axial flow pressurizing device can be reduced.

(9) A pressurizing device according to the disclosure is a pressurizing device (2A, 2B) including:

a plurality of stages (3A to 3F) disposed in series in a flow direction of a fluid, wherein each of the plurality of stages includes a rotary blade row (12) including a plurality of rotary blades (10) provided at intervals in a circumferential direction and a stationary blade row (27, 29, 40) provided downstream of the rotary blade row in the flow direction and including a plurality of stationary blades (24, 26, 38) provided at intervals in the circumferential direction; and with reference to an enthalpy-pressure line (V) that indicates a relationship between an enthalpy and a pressure of the fluid when the fluid is isothermally compressed, a point where an absolute value of a gradient of a pressure relating to an enthalpy of the fluid is the smallest is defined as a smallest gradient point (K), a line connecting each smallest gradient point of the enthalpy-pressure line for each temperature of the fluid is defined as a first line (L1), an intersection point between a line (Q), which indicates a relationship between an enthalpy and a pressure of the fluid inside the pressurizing device from an inlet to an outlet for the fluid, and the first line is defined as a first intersection point (X), a stage, of the plurality of stages, corresponding the first intersection point is defined as a first intersection-corresponding stage (3B), and a heat exchange amount between the first intersection-corresponding stage and the fluid is greater than a heat exchange amount between the fluid and at least one stage other than the first intersection-corresponding stage of the plurality of stages.

In the case in which the fluid above its critical pressure is pressurized, the stage in which the smallest gradient point is passed is often a relatively upstream stage. In a typical multi-stage pressurizing device, an upstream stage has a relatively large flow path width. Thus, the heat transfer area where heat exchange with the fluid occurs is small relative to the large flow path cross-sectional area, and the heat transfer efficiency is easily reduced because of the large equivalent diameter of the flow path. Therefore, effective cooling of the fluid is difficult.

In this regard, according to the pressurizing device of (9) described above, by the heat exchange amount between the first intersection-corresponding stage and the fluid being greater than the heat exchange amount between the fluid and at least one stage other than the first intersection-corresponding stage among the plurality of stages, the fluid can be effectively cooled in the first intersection-corresponding stage where need to cool the fluid is high. This allows the pressurizing device requiring little motive power for pressurizing to be realized.

Note that in (9) described above, the heat exchange amount between the step and the fluid can be determined, for example, as described below. First, the pressure and temperature are measured for each of the inlets and outlets of the stationary blade row of each stage. The enthalpy is then determined from the measured pressure and temperature. Then, the heat exchange amount (kW) is obtained by multiplying the flow rate (kg/s) of the fluid pressurized and the enthalpy difference (kJ/kg) between the inlet and the outlet of the stationary blade row.

(10) In some embodiments, in the pressurizing device according to (9) described above, a heat exchange amount between the first intersection-corresponding stage (3B) and the fluid is the greatest among heat exchange amounts between the fluid and each of the plurality of stages.

According to (10) described above, the fluid can be effectively cooled in the first intersection-corresponding stage where need to cool the fluid is high. This allows the pressurizing device requiring little motive power for pressurizing to be realized.

(11) In some embodiments, in the pressurizing device according to (9) or (10) described above, a cooling flow path (32, 34, 36, 42, 44) through which a cooling medium flows is provided in each of the plurality of stages; and a temperature of the cooling medium flowing through the cooling flow path formed in the first intersection-corresponding stage is lower than a temperature of the cooling medium flowing through the cooling flow path of at least one stage other than the first intersection-corresponding stage among the plurality of stages.

According to (11) described above, the fluid can be effectively cooled in the first intersection-corresponding stage where need to cool the fluid is high. This allows the pressurizing device requiring little motive power for pressurizing to be realized.

(12) In some embodiments, in the pressurizing device according to (11) described above, a temperature of the cooling medium flowing through the cooling flow path formed in the first intersection-corresponding stage is the lowest among temperatures of the cooling medium flowing through the cooling flow path of each of the plurality of stages.

According to (12) described above, the fluid can be effectively cooled in the first intersection-corresponding stage where need to cool the fluid is high. This allows the pressurizing device requiring little motive power for pressurizing to be realized.

(13) In some embodiments, in the pressurizing device according to any one of (9) to (12) described above, a heat transfer area where heat exchange with the fluid occurs in the first intersection-corresponding stage is greater than a heat transfer area where heat exchange with the fluid occurs in at least one stage other than the first intersection-corresponding stage among the plurality of stages.

According to (13) described above, the fluid can be effectively cooled in the first intersection-corresponding stage where need to cool the fluid is high. This allows the pressurizing device requiring little motive power for pressurizing to be realized.

(14) In some embodiments, in the pressurizing device according to (13) described above, a heat transfer area where heat exchange with the fluid occurs in the first intersection-corresponding stage is the greatest among heat transfer areas where heat exchange with the fluid occurs in each of the plurality of stages.

According to (14) described above, the fluid can be effectively cooled in the first intersection-corresponding stage where need to cool the fluid is high. This allows the pressurizing device requiring little motive power for pressurizing to be realized.

(15) In some embodiments, in the pressurizing device according to any one of (9) to (14) described above, a plurality of heat exchanging units (28) for cooling the fluid are further provided, wherein each of the plurality of heat exchanging units is configured to divide a flow path formed between stationary blades, of the plurality of stationary blades, adjacent to one another in the circumferential direction in a height direction of the stationary blades;

the first intersection-corresponding stage is provided with the heat exchanging unit; and at least one stage other than the first intersection-corresponding stage among the plurality of stages is not provided with the heat exchanging unit.

According to (15) described above, the fluid can be effectively cooled by heat exchange with the heat exchanging unit in the first intersection-corresponding stage where need to cool the fluid is high. This allows the pressurizing device requiring little motive power for pressurizing to be realized. Furthermore, the configuration of the pressurizing device can be simplified by not providing a heat exchanging unit in a stage where the need to cool the fluid is low.

(16) A carbon dioxide cycle plant (100) according to the disclosure includes:

the pressurizing device according to any one of (1) to (15) described above;

a heater (102);

an expander (104); and a cooler (106), wherein the pressurizing device pressurizes carbon dioxide;

the heater heats the carbon dioxide pressurized by the pressurizing device;

the expander expands the carbon dioxide heated by the heater and extracts work; and the cooler cools the carbon dioxide expanded by the expander.

According to the carbon dioxide cycle plant of (16) described above, by applying the pressurizing device of any one of (1) to (17) described above, it is possible to reduce the motive power required to pressurize carbon dioxide to a supercritical pressure, allowing a highly efficient carbon dioxide cycle plant to be realized.

(17) A combined cycle plant (200) according to the disclosure includes:

the carbon dioxide cycle plant according to (16) described above; and an exhaust gas generation source (202), wherein the heater of the carbon dioxide cycle plant is configured to heat carbon dioxide by heat exchange between the carbon dioxide and exhaust gas of the exhaust gas generation source.

According to the combined cycle plant of (17) described above, by providing the highly efficient carbon dioxide cycle plant of (16) described above, a highly efficient combined cycle plant can be realized.

(18) In some embodiments, in the combined cycle plant according to (17) described above, the exhaust gas generation source is at least one of: a gas turbine, a reciprocating engine, a steam engine, or a fuel cell.

According to the combined cycle plant of (18) described above, thermal energy of exhaust gas obtained from at least one of: a gas turbine, a reciprocating engine, a steam engine, or a fuel cell can be used to heat the carbon dioxide pressurized by the pressurizing device. This allows for a highly efficient combined cycle plant to be realized.

(19) In the carbon dioxide cycle plant of (16) described above according of the disclosure, the heater (102) is provided with a reactor (301) and is configured to heat the carbon dioxide using heat generated by a nuclear reaction in the reactor.

According to the carbon dioxide cycle plant of (19) described above, the carbon dioxide pressurized by the pressurizing device can be heated using the thermal energy generated by the reactor. This allows for a highly efficient carbon dioxide cycle plant to be realized.

(20) In the carbon dioxide cycle plant of (16) described above according to the disclosure, the heater (102) is provided with a reflective mirror (401) and a heat receiving portion (402) and is configured to heat the carbon dioxide via solar heat at the heat receiving portion by sunlight being reflected by the reflective mirror and guided to the heat receiving portion.

According to the carbon dioxide cycle plant of (20) described above, the carbon dioxide pressurized by the pressurizing device can be heated using solar heat. This allows for a carbon dioxide cycle plant that utilizes renewable energy to be realized. In addition, the motive power required for pressurizing can be reduced, and a large output can be obtained from a relatively small scale plant.

While preferred embodiments of the invention have been described as above, it is to be understood that variations and modifications will be apparent to those skilled in the art without departing from the scope and spirit of the invention. The scope of the invention, therefore, is to be determined solely by the following claims.

The invention claimed is:

1. A non-positive displacement type pressurizing device for pressurizing a fluid, comprising:
   a rotor including a rotary blade row including a plurality of rotary blades provided at intervals in a circumferential direction;
   a casing that accommodates the rotor;
   a stationary blade row supported by the casing and including a plurality of stationary blades provided at intervals in the circumferential direction; and
   a plurality of heat exchanging units for cooling the fluid, wherein
   the heat exchanging units are configured to divide a flow path formed between stationary blades, of the plurality of stationary blades, adjacent to one another in the circumferential direction in a height direction of the stationary blades.

2. The pressurizing device according to claim 1, wherein a cooling flow path through which a cooling medium flows is formed inside the casing.

3. The pressurizing device according to claim 1, wherein a cooling flow path through which a cooling medium flows is formed inside the stationary blades.

4. The pressurizing device according to claim 1, wherein a cooling flow path through which a cooling medium flows is formed inside the heat exchanging units.

5. The pressurizing device according to claim 1, wherein at least one of the plurality of heat exchanging units is configured to connect the stationary blades together, of the plurality of stationary blades, adjacent to one another in the circumferential direction.

6. The pressurizing device according to claim 1, wherein at least one of the plurality of heat exchanging units includes
   a first-side protruding portion configured to project from a first stationary blade of the stationary blades adjacent to one another toward a second stationary blade, and
   a second-side protruding portion configured to project from the second stationary blade toward the first stationary blade; and
   a projection amount of the first-side protruding portion projecting from the first stationary blade toward the second stationary blade is defined as $d1$, a projection amount of the second-side protruding portion projecting from the second stationary blade toward the first stationary blade is defined as $d2$, a distance between a trailing edge of the first stationary blade and a trailing edge of the second stationary blade is defined as $d3$, and $d1+d2>d3$ is satisfied.

7. The pressurizing device according to claim 1, wherein the pressurizing device is a centrifugal pressurizing device.

8. The pressurizing device according to claim 1, wherein the pressurizing device is an axial flow pressurizing device.

9. A pressurizing device, comprising:
   a plurality of stages disposed in series in a flow direction of a fluid, wherein
   each of the plurality of stages includes a rotary blade row including a plurality of rotary blades provided at intervals in a circumferential direction and a stationary blade row provided downstream of the rotary blade row in the flow direction and including a plurality of stationary blades provided at intervals in the circumferential direction; and with reference to an enthalpy-pressure line that indicates a relationship between an enthalpy and a pressure of the fluid when the fluid is isothermally compressed, a point where an absolute value of a gradient of a pressure relating to an enthalpy of the fluid is the smallest is defined as a smallest gradient point, a line connecting each smallest gradient point of the enthalpy-pressure line for each temperature of the fluid is defined as a first line, an intersection point between a line, which indicates a relationship between an enthalpy and a pressure of the fluid inside the pressurizing device from an inlet to an outlet for the fluid, and the first line is defined as a first intersection point, a stage, of the plurality of stages, corresponding the first intersection point is defined as a first intersection-corresponding stage, and a heat exchange amount between the first intersection-corresponding stage and the fluid is greater than a heat exchange amount between the fluid and at least one stage other than the first intersection-corresponding stage of the plurality of stages.

10. The pressurizing device according to claim 9, wherein a heat exchange amount between the first intersection-corresponding stage and the fluid is the greatest among heat exchange amounts between the fluid and each of the plurality of stages.

11. The pressurizing device according to claim 9, wherein a cooling flow path through which a cooling medium flows is provided in each of the plurality of stages; and a temperature of the cooling medium flowing through the cooling flow path formed in the first intersection-corresponding stage is lower than a temperature of the cooling medium flowing through the cooling flow path of at least one stage other than the first intersection-corresponding stage among the plurality of stages.

12. The pressurizing device according to claim 11, wherein a temperature of the cooling medium flowing through the cooling flow path formed in the first intersection-corresponding stage is the lowest among temperatures of the cooling medium flowing through the cooling flow path of each of the plurality of stages.

13. The pressurizing device according to claim 9, wherein a heat transfer area where heat exchange with the fluid occurs in the first intersection-corresponding stage is greater than a heat transfer area where heat exchange with the fluid occurs in at least one stage other than the first intersection-corresponding stage among the plurality of stages.

14. The pressurizing device according to claim 13, wherein a heat transfer area where heat exchange with the fluid occurs in the first intersection-corresponding stage is the greatest among heat transfer areas where heat exchange with the fluid occurs in each of the plurality of stages.

15. The pressurizing device according to claim 9, further comprising a plurality of heat exchanging units for cooling the fluid, wherein each of the plurality of heat exchanging units is configured to divide a flow path formed between stationary blades, of the plurality of stationary blades, adjacent to one another in the circumferential direction in a height direction of the stationary blades;

the first intersection-corresponding stage is provided with the heat exchanging unit; and at least one stage other than the first intersection-corresponding stage among the plurality of stages is not provided with the heat exchanging unit.

16. A carbon dioxide cycle plant, comprising:

the pressurizing device according to claim 1;

a heater;

an expander; and a cooler, wherein the pressurizing device pressurizes carbon dioxide;

the heater heats the carbon dioxide pressurized by the pressurizing device;

the expander expands the carbon dioxide heated by the heater and extracts work; and the cooler cools the carbon dioxide expanded by the expander.

17. A combined cycle plant, comprising:

the carbon dioxide cycle plant according to claim 16; and an exhaust gas generation source, wherein the heater of the carbon dioxide cycle plant is configured to heat carbon dioxide by heat exchange between the carbon dioxide and exhaust gas of the exhaust gas generation source.

18. The combined cycle plant according to claim 17, wherein the exhaust gas generation source is at least one of: a gas turbine, a reciprocating engine, a steam engine, or a fuel cell.

19. The carbon dioxide cycle plant according to claim 16, wherein the heater is provided with a reactor and is configured to heat the carbon dioxide using heat generated by a nuclear reaction in the reactor.

20. The carbon dioxide cycle plant according to claim 16, wherein the heater is provided with a reflective mirror and a heat receiving portion and is configured to heat the carbon dioxide via solar heat at the heat receiving portion by sunlight being reflected by the reflective mirror and guided to the heat receiving portion.

\* \* \* \* \*